United States Patent
Toma et al.

(10) Patent No.: US 7,558,296 B2
(45) Date of Patent: Jul. 7, 2009

(54) MULTIPLEXER AND DEMULTIPLEXER

(75) Inventors: Tadamasa Toma, Toyonaka (JP); Yoshinori Matsui, Ikoma (JP); Youji Notoya, Neyagawa (JP)

(73) Assignee: Panasonic Corporation, Osaka (JP)

( * ) Notice: Subject to any disclaimer, the term of this patent is extended or adjusted under 35 U.S.C. 154(b) by 665 days.

(21) Appl. No.: 10/517,260

(22) PCT Filed: Jun. 17, 2003

(86) PCT No.: PCT/JP03/07639

§ 371 (c)(1),
(2), (4) Date: Dec. 7, 2004

(87) PCT Pub. No.: WO2004/004334

PCT Pub. Date: Jan. 8, 2004

(65) Prior Publication Data

US 2005/0238057 A1    Oct. 27, 2005

(30) Foreign Application Priority Data

Jun. 26, 2002 (JP) .............................. 2002-185758
Mar. 24, 2003 (JP) .............................. 2003-081133

(51) Int. Cl.
*H04J 3/04* (2006.01)
*H04J 3/24* (2006.01)
*H04N 5/91* (2006.01)
*H04N 7/12* (2006.01)

(52) U.S. Cl. .................. 370/535; 370/474; 370/503; 386/98; 375/240.01

(58) Field of Classification Search .......... 370/474, 370/503–521, 535–545; 375/240.01–240.28; 386/95–111
See application file for complete search history.

(56) References Cited

U.S. PATENT DOCUMENTS 5,537,215 A * 7/1996 Niimura et al. .............. 386/111

(Continued)

FOREIGN PATENT DOCUMENTS

EP          0 634 870         4/1999

(Continued)

OTHER PUBLICATIONS

Hiroshi Yasuda, "*International Standard for Multimedia Encoding*", Maruzen Co., Ltd., pp. 221-232, Jun. 30, 1991.

*Primary Examiner*—Tri H Phan
(74) *Attorney, Agent, or Firm*—Wenderoth, Lind & Ponack, L.L.P.

(57) ABSTRACT

The multiplexer includes a first input unit, a second input unit, a first analysis unit, and a second analysis unit. Moreover, the multiplexer includes a packetization part determination unit that determines the packetization part of audio data in a way that the packetization part is made to be the same or approximately the same as a playback start time of a video sample that is placed in a leading part of the packetization part of video data after determining the packetization part of the video data based on video sample header information. Furthermore, the multiplexer includes a packet header part generation unit that generates a packet header part on the basis of the determined packetization part, a packet data generation unit that generates a packet data unit on the basis of the determined packetization part and a packet connection unit that generates a packet.

16 Claims, 28 Drawing Sheets

U.S. PATENT DOCUMENTS

| | | | |
|---|---|---|---|
| 5,537,409 A * | 7/1996 | Moriyama et al. | 370/471 |
| 5,923,869 A * | 7/1999 | Kashiwagi et al. | 713/501 |
| 6,438,316 B1 * | 8/2002 | Henmi et al. | 386/95 |
| 6,512,884 B1 * | 1/2003 | Sawada | 386/96 |
| 7,054,546 B2 * | 5/2006 | Murakami et al. | 386/98 |
| 2002/0041609 A1 * | 4/2002 | Toida et al. | 370/535 |

FOREIGN PATENT DOCUMENTS

| | | |
|---|---|---|
| JP | 5-64171 | 3/1993 |
| JP | 6-326967 | 11/1994 |
| JP | 7-38857 | 2/1995 |
| JP | 10-051495 | 2/1998 |
| JP | 2001-45477 | 2/2001 |
| JP | 2002-176622 | 6/2002 |

* cited by examiner

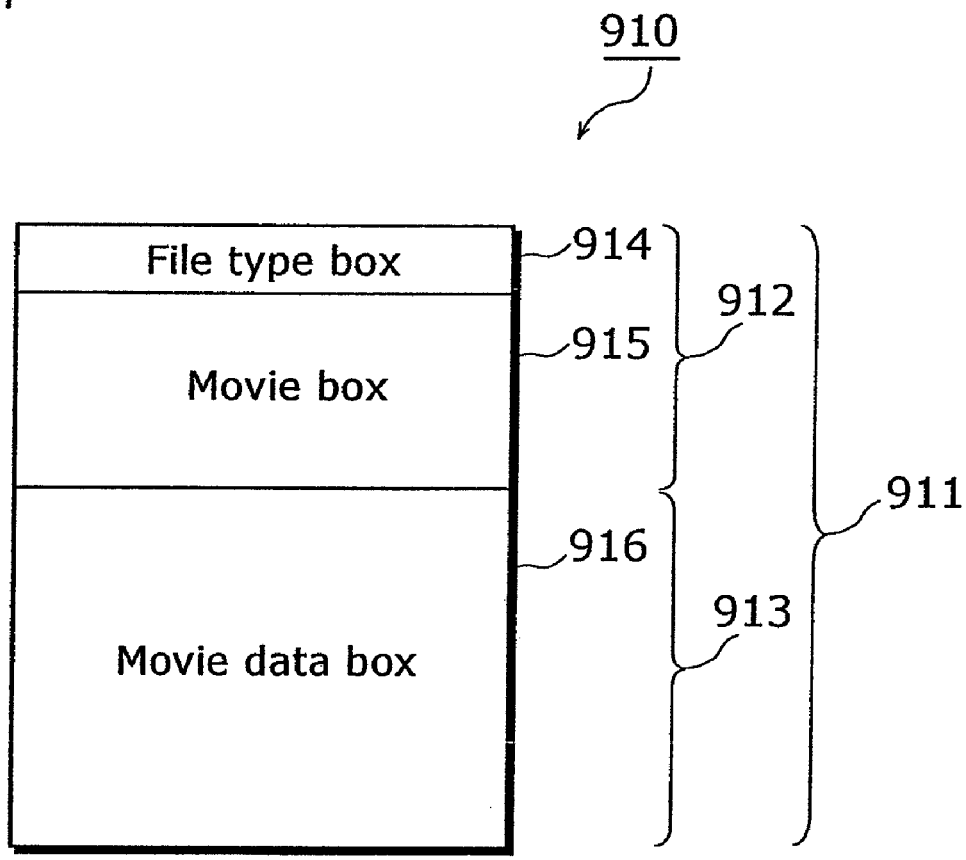
PRIOR ART  FIG. 2

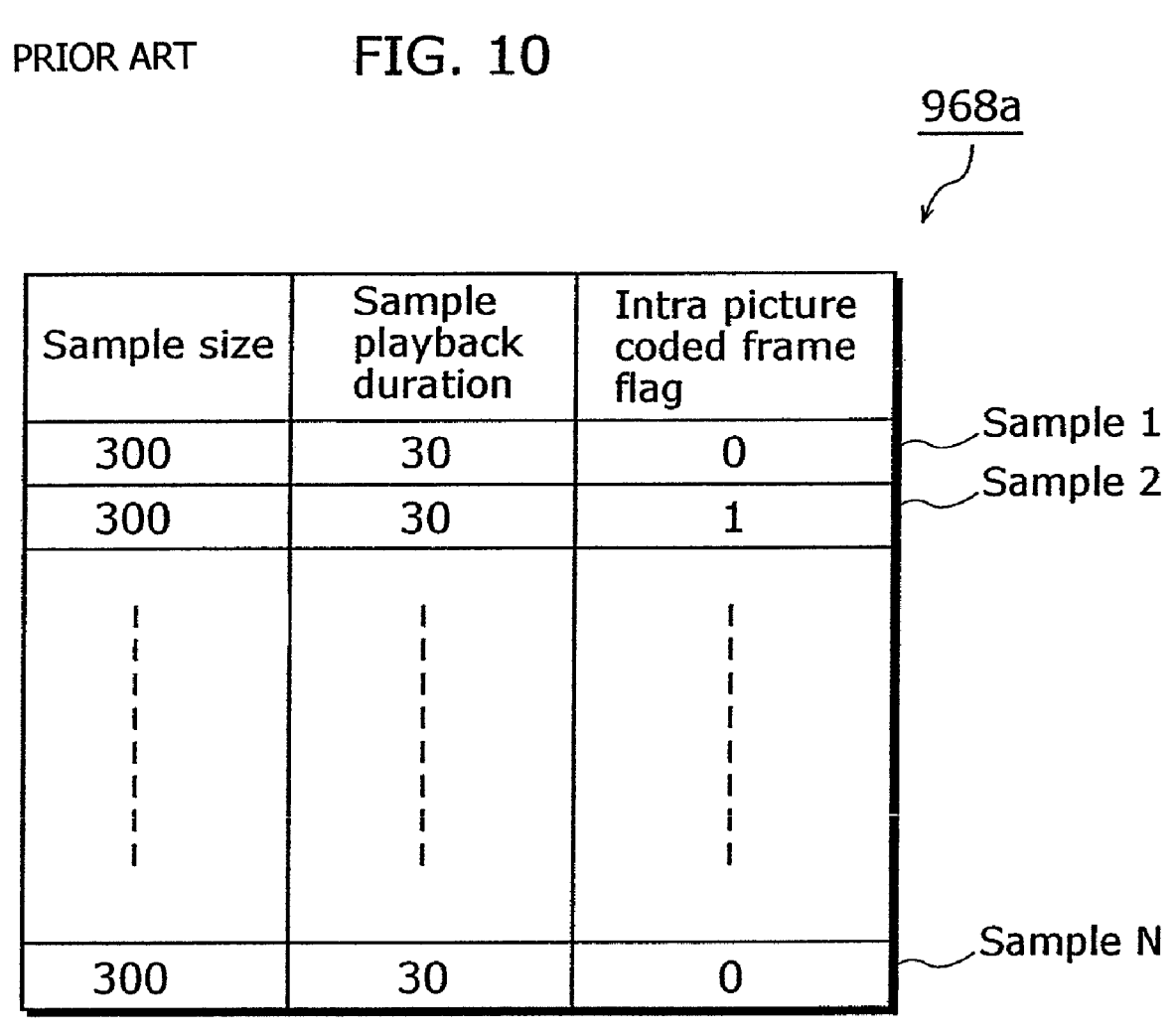

| Sample size | Sample playback duration | Intra picture coded frame flag | |
|---|---|---|---|
| 300 | 30 | 0 | Sample 1 |
| 300 | 30 | 1 | Sample 2 |
| ⋮ | ⋮ | ⋮ | |
| 300 | 30 | 0 | Sample N |

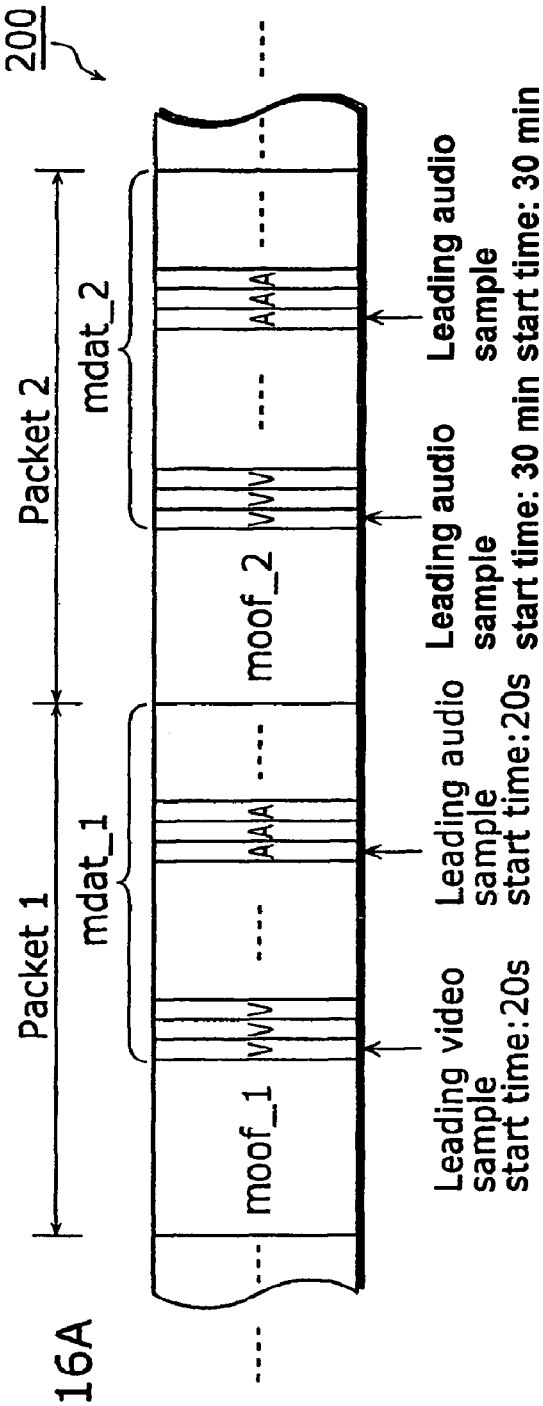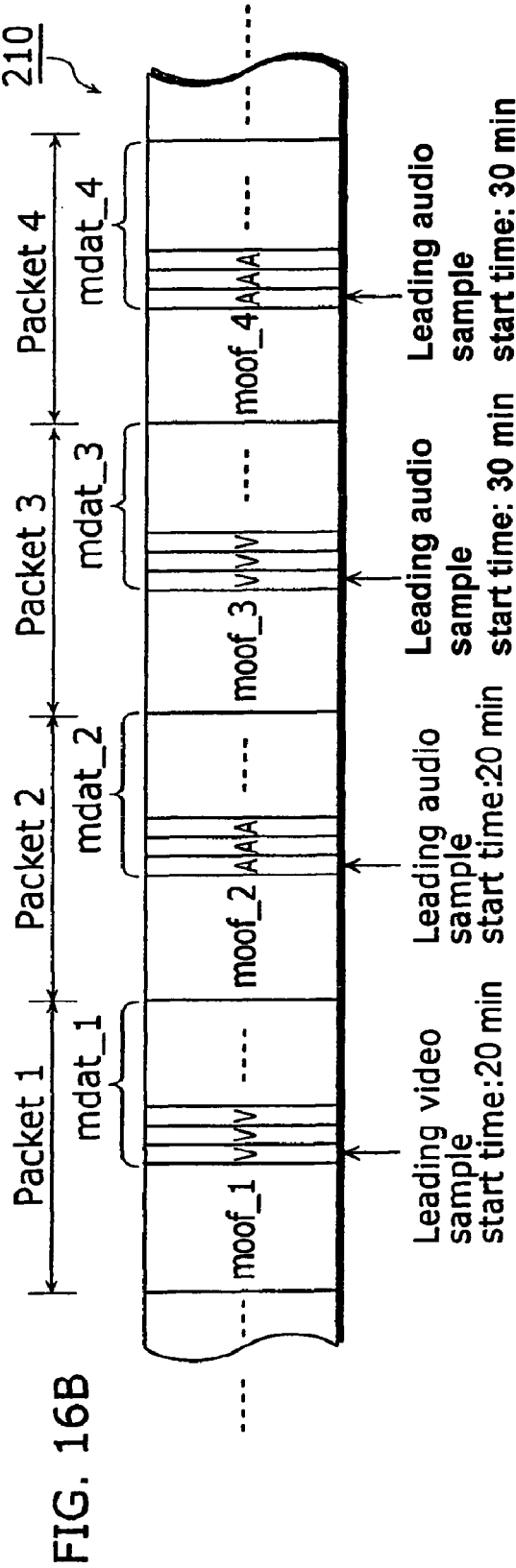
FIG. 16A
FIG. 16B

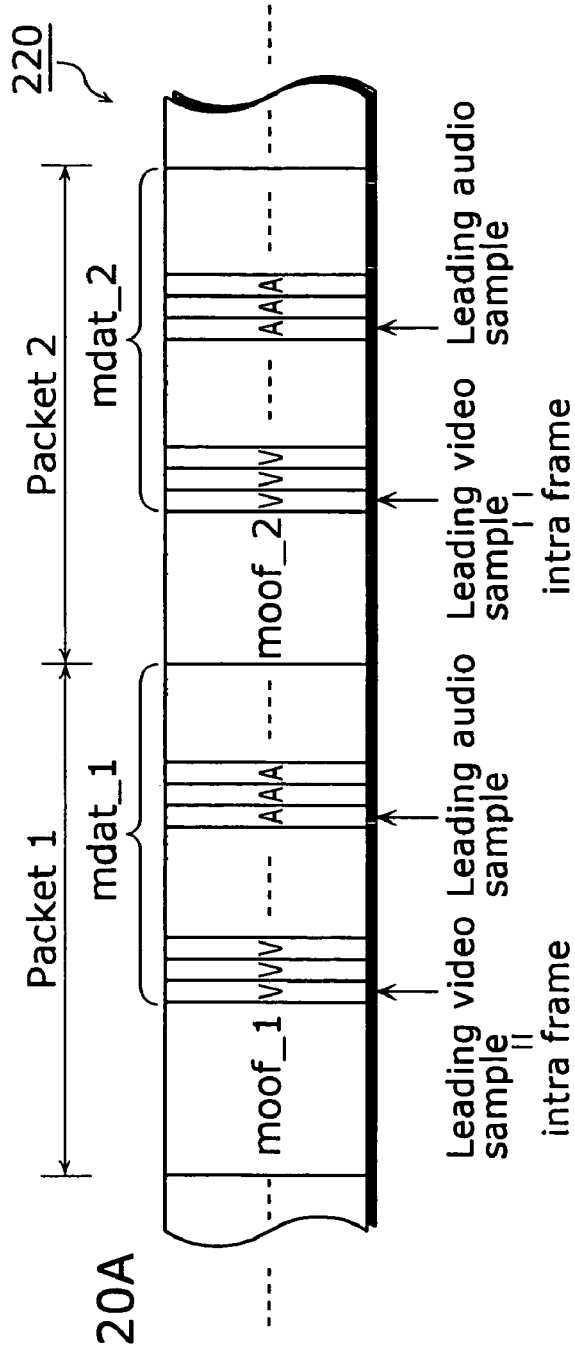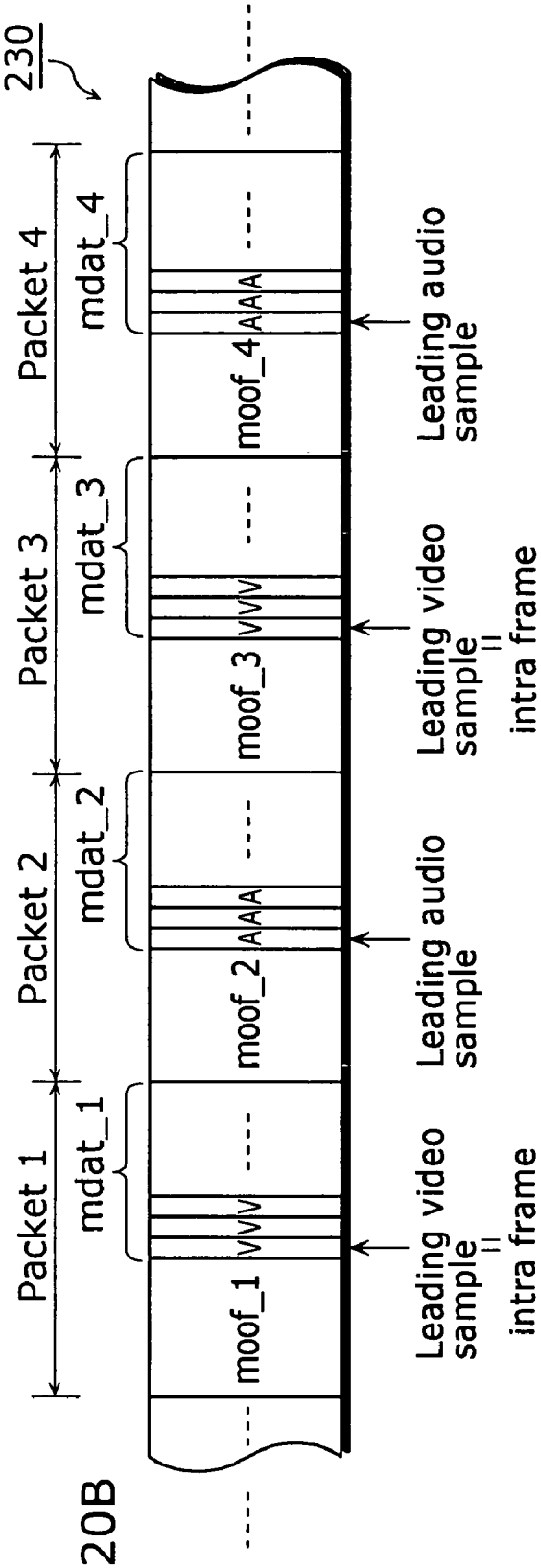

MULTIPLEXER AND DEMULTIPLEXER

CROSS-REFERENCE TO RELATED APPLICATIONS

This application is the National Stage of International Application No. PCT/JP03/07639, filed Jun. 17, 2003.

BACKGROUND OF THE INVENTION

1. Field of the Invention

The present invention relates to a multiplexer that multiplexes media data such as video data, audio data and the like and a demultiplexer that reads and demultiplexes a bit string where media data such as video data, audio data and the like are multiplexed.

2. Description of the Related Art

The recent increase in capacity of a communication network and the development of a transmission technique has remarkably popularized the online video distribution service of distributing a video file of a multimedia content including video, audio, text, a still picture and the like to a personal computer. Also, the third generation partnership project (3GPP) that is an international standardization group which has an object to standardize the standards of the so-called third-generation mobile communication systems such as mobile terminals are seen making a movement of defining the transparent end-to-end packet switched streaming service (TS26.234) as a standard related to a wireless video distribution, and the video distribution service is expected to be further provided to mobile communication terminals such as mobile phones and PDAs.

When distributing a video file in the video distribution service, a multiplexer reads media data such as a video, a still picture, audio, text and the like and multiplexes header information necessary for playing back the media data and the entity data of the media data so as to generate video file data. As a multiplex file format of this video file data, an MP4 file format is focused on.

This MP4 file format is the multiplex file format which is under standardization by the international standardization organization/international engineering consortium (ISO) JTC1/SC29/WG11 that is the international standardization group and expected to become widely spread because it is also employed by the TS26.234 of the above-mentioned 3GPP.

Here, the data structure of the MP4 file will be explained.

The MP4 file stores the header information and the entity data of media data on a basis of an object called box and is made up of plural boxes that are arranged hierarchically.

FIG. 1 is a diagram for explaining the structure of a box included in a conventional MP4 file.

The box 901 is made of a box header part 902 where the header information of the box 901 is stored and a box data storage part 903 where data included in the box 901 (such as a sub-box of the box and a field for describing the information) is stored.

This box header part 902 has fields of a box size 904, a box type 905, a version 906 and a flag 907.

The box size 904 is the field describing the size information of the whole box 901, including the byte size assigned for this field.

The box type 905 is the field describing the identifier for identifying the type of the box 901. This identifier is generally presented by four alphabet strings. Note that there are cases where each box is shown by using this identifier in this specification.

The version 906 is the field where a version number showing the version of the box 901 is described, and the flag 907 is the field describing flag information that is set for each box 901. This version 906 and the flag 907 are not always necessary for all boxes 901, and a box 901 that does not have these fields may exist.

The MP4 file made of a series of boxes 901 that has this structure can be broadly divided into a basic part that is essential in the file structure and an extension part that is used as a need arises. First, the basic part of the MP4 file will be explained.

FIG. 2 is a diagram for explaining the basic part of a conventional MP4 file.

The basic part 911 of the MP4 file 910 is made of a file header part 912 and a file data part 913.

The file header part 912 is the part where header information of the whole file such as the information on a video data compression coding method and the like of video data is stored and is made of a file type box 914 and a movie box 915.

The file type box 914 is a box identified by the identifier "ftyp" and stores the information for identifying the MP4 file. As the standardization group or a service provider can arbitrarily prescribe which media data is stored in the MP4 file and which compression coding method is used for the video data, the audio data and the like that is stored in the MP4 file, the information for identifying the prescription according to which the MP4 file is generated is stored in this file type box 914.

The movie box 915 is the box identified as the identifier "moov" and stores header information of the entity data stored in the file data part 913 such as a display duration.

The file data part 913 is made of a movie data box 916 identified as the identifier "mdat". Note that it is also possible to refer to an external file that is different from this MP4 file 910 instead of this file data part 913. In this way, in the case of referring to the external file, the basic part 911 of the MP4 file 910 is made essentially of the file header part 912. In this specification, the case where entity data is included in the MP4 file 910 will be explained, not the case where this external file is referred to.

The movie data box 916 is a box for storing the entity data of the media data on a basis of a unit called sample. This sample is a smallest access unit in the MP4 file and corresponds to a video object plane (VOP) of the video data coded in a compression coding method of the moving picture experts group 4 visual (MPEG) or a frame of the audio data.

Here, the lower hierarchy in the structure of the movie box 915 in the basic part of a conventional MP4 file will be explained.

FIG. 3 is a diagram for explaining the structure of the movie box in the conventional MP4 file.

As shown in FIG. 3A, the movie box 915 is made of the box header part 902 and the box data storage part 903 that have already been explained. And, the size information of the movie box 915 is described ("xxxx" in FIG. 3A) in the field of the box size 904 that constitutes the box header part 902, and the identifier "moov" of the movie box 915 is described in the field of the box type 905.

Also, the movie header box 917 where the header information of the basic part 911 of the MP4 file 910 is stored or the track box 918 where the header information for each track such as the video track and the audio track is stored in the box data storage part 903 of the movie box 915. Note that a track here means the whole sample data of each media included in the MP4 file 910, and the track of a video, audio, a text or the like is called as a video track, an audio track, a text track or the like respectively. Also, in the case where a plurality of data of the same media are included in the MP4 file 910, a plurality of tracks exist in the same media. Specifically explaining, in an example case where two types of video data are included in the MP4 file 910, two video tracks exist.

The movie header box 917 is made of the box header part 902 and the box data storage part 903 that have already been explained, the size information of the movie header box 917 is described ("xxx" in FIG. 3A) in the field of the box size 904 that constitutes the box header part 902, and the identifier "mvhd" of the movie header box 917 is described in the field of the box type 905. And, information on the duration needed for playing back the content included in the basic part 911 of the MP4 file 910 and the like is stored in the box data storage part 903 of the movie header box 917.

Also, the size information of the track box 918 ("xx" in FIG. 3A) is described in the field of the box size 904 that constitutes the box header part 902 of the track box 918, the identifier "track" of the track box 918 is described in the field of the box type 905. And, the track header box 919 is stored in the box data storage part 903 of the track box 918.

The track header box 919 is the box that has a field for describing the header information for each track and is identified by the identifier "tkhd". The field for describing a track ID for identifying the track type or the information on the duration needed for playing back the track is described in the box data storage part 903 of this track header box 919.

In this way, boxes 901 are arranged hierarchically in the movie box 915, and header information for each track for a video, audio or the like is stored in the track box 918 that can be identified by "trak". And, header information on a basis of a track sample is stored in the lower boxes included in this track box 918.

When showing the structure of the movie box 915 shown in FIG. 3A as a tree, a diagram like FIG. 3B can be obtained.

In other words, it is shown that a movie header box 917 and a track box 918 are arranged as a group of lower boxes of the movie box 915, a track header box 919 is arranged as a group of lower box of the track box 918, and boxes 901 are arranged hierarchically.

At the initial stage of standardizing the MP4 file format, the MP4 file 910 is made essentially of the above-mentioned basic part 911. However, the increase in the information amount of media data entails the increase in the file size, which produces various problems such as the difficulty in the application for streaming playback, and thus an improvement of additionally using an extension part where a plurality of combinations of a header box and a data box are serially arranged.

FIG. 4 is a diagram showing the structure of a conventional MP4 file including an extension part.

As shown in FIG. 4, the MP4 file 920 to which the above-mentioned improvement is added is made of a basic part 911 and an extension part 921. The MP4 file 920 including this extension part 921 can store all of the media data in the extension part 921, it is possible to omit the movie data box 916 of the MP4 file basic part 911.

The extension 921 is made of a plurality of packets 922 that is divided on a basis of predetermined part.

This packet 922 is made of a pair of a movie fragment box 923 and a movie data box 916, and also called as movie fragment.

The movie data box 916 stores a sample for each track on a basis of the above-mentioned predetermined part. The movie fragment box 923 is the box for storing the header information corresponding to this movie data box 916 and identified by the identifier "moof". The structure of this movie fragment box 923 will be explained more specifically.

FIG. 5 is a diagram for explaining the structure of a conventional movie fragment box.

As shown in FIG. 5, a movie fragment header box 924 and a plurality of track fragment boxes 925 are stored in the box data storage unit 903 of the movie fragment box 923.

The movie fragment header box 924 is the box identified by the identifier "mfhd" and stores the header information of the whole movie fragment box 923.

The track fragment box 925 is the box identified by the identifier "traf" and stores the header information for each track.

Note that a single track fragment box 925 is generally prepared for the header information of a single track, but it is also possible to prepare a plurality of track fragment boxes 925 for a single track header information. In this way, when a single track header information is divided into a plurality of track fragment boxes 925 so as to be stored, decoding time of the leading sample of the track fragment box 925 is arranged in an ascending order.

After that, a track fragment header box 926 and one or more track fragment run box 927 are stored in the box data storage part 903 of this track fragment box 925.

The track fragment header box 926 is the box identified by the identifier "tfhd" and stores a field for describing the track ID for identifying the type of a track or information on the default value such as the playback time of a sample and the like.

The track fragment run box 927 is the box identified by the identifier "trun" and stores the header information on a basis of a sample. This track fragment run box 927 will be explained with reference to FIG. 6.

FIG. 6 is a diagram for explaining the structure of a conventional track fragment run box 927.

The flag 907 is the field describing flag information set for each box 901, here the flag information showing whether each field from the data offset 929 to the sample composition time offset 936 is included in the track fragment run box 927 next to the flag 907.

The sample count 928 is the field describing the information showing the number of header information items concerning the sample is stored in the track fragment run box 927.

The data offset 929 is the field describing the pointer information showing in which part of the movie data box 916 paring with the entity data of the sample placed at the leading part of the track fragment run box 927 among the samples whose header information items are stored in the track fragment run box 927.

The leading sample flag 930 is the field where the value of the filed of the later-explained sample flag 935 is overwritten in the case where the leading sample of the track fragment run box 927 is a randomly-accessible sample. Here, the random access means the processing operation of moving the playback location of data in the middle of the playback to the location 10 minutes later or starting the playback from the point in the middle of the data in a playback apparatus of the MP4 file. In addition, the randomly-accessible sample is the sample, among video samples, that constitutes a frame that can be solely decoded without referring to other frame data, that is an intra coded frame (so-called an intra frame) in the playback apparatus of the MP4 file. Note that all the audio samples are the samples that are randomly accessible because all of the audio samples can be solely decoded.

The table 931 is the one where the same number of entries 932 showing the header information items for respective samples as the number of entries shown in the sample count 928 is integrated.

The entry 932 is a collection of fields showing header information items for respective samples, and the included field is indicated by the above-mentioned flag 907. Fields included in the entry 932 includes a sample duration 933 describing a sample playback duration, a sample size 934 describing a sample size, a sample flag 935 describing the flag information indicating whether the sample is randomly accessible or not, and a sample composition time offset 936 describing the differential value between the sample decoding time and the sample display time in order to handle samples using an interactive prediction.

Note that, these fields are not included in the entry 932, as default values of these fields are described in the track fragment header box 926 or the movie extend box (identifier "mvex") in the movie fragment box 915, these default value of the fields are used for each of the sample header information items.

Also, the header information items of samples are described in the track fragment run box 927 in the order of decoding time. Therefore, at the time when the apparatus that plays back the MP4 file searches the sample header information items, referring to track IDs in the track fragment header box 926 starting from the track fragment box 925 that is the leading box in the file means searching the track fragment box 925 including the header information item of the track to be obtained and searching the header information of a sample starting from the track fragment run box 927 that is the leading box in the track fragment box 925.

Note that, in the case of the MP4 file 920 including this extension part 921, the information necessary for the whole track such as the initial information at the time of decoding is stored in the movie box 915.

Next, the structure example of the MP4 file including the extension 921 having the structure like this will be explained.

FIG. 7 is a diagram showing the structure example of the extension part of the MP4 file including the conventional extension part.

In FIG. 7, the storage method of a content will be explained showing two examples, and the content playback duration is 60 seconds.

The MP4 file 940 shown as FIG. 7A has the structure of storing media data in both the basic part 941 and the extension part 942. In other words, a part of the media data from 0 to 30 seconds is stored in the mdat_1 (code 945) of the basic part 941, a part of the media data from 30 to 45 seconds is stored in the mdat_2 (code 947) of the extension part 942, and a part of the media data from 45 to 60 seconds is stored in the mdat_3 (code 949). In addition, the header information of mdat_1 (code 945) is stored in moov 944, the header information of mdat_2 (code 947) is stored in the moof_1 (code 946) and the header information of mdat_3 (code 949) is stored in the moof_2 (code 948).

In contrast, the MP4 file 950 shown in FIG. 7B has the structure of storing the media data in the extension part 952 only. In other words, the basic part 951 is made of ftyp 953 and moov 954 and does not include any mdat, a part of media data from 0 to 30 seconds is stored in mdat_1 (code 956) in the extension part 952, and a part of the media data from 30 to 60 seconds is stored in mdat_2 (code 958). In addition, the header information of mdat_1 (code 956) is stored in moof_1 (code 955), and the header information of mdat_2 (code 958) is stored in moof_2 (code 957).

Here, how the extension part of the above-mentioned MP4 file is generated will be explained with reference to FIG. 8 to FIG. 10.

FIG. 8 is a block diagram showing the structure of the conventional multiplexer.

The multiplexer 960 is an apparatus that multiplexes the media data and generates the extension part data of the MP4 file. Here, the extension part data of the MP4 file is generated by multiplexing video data and audio data.

The first input unit 961 captures video data in the multiplexer 960 and has the first data storage unit 962 store the video data. Also, the second input unit 964 captures audio data in the multiplexer 960 and has the second data storage unit 965 to store the audio data.

The first analysis unit 963 reads out samples of video data items one by one from the first data storage unit 962 so as to analyze them and outputs the header information items of the video samples to the packetization part determination unit 967. Also, the second analysis unit 966 reads out samples of audio data one by one from the second data storage unit 965 so as to analyze them and outputs the header information items of the audio samples to the packetization part determination unit 967. The header information items of video samples and the header information items of audio samples include the information indicating the size or the playback durations of the samples, and the header information items of video samples include the information items showing whether the video samples are intra frames or not.

The packetization part determination unit 967 determines the packetization part of the video data and the audio data so that the number of samples included in the packet become constant and generates the header information items of the respective packets based on the obtained sample header information items.

FIG. 9 shows the processing operation flow of the conventional packetization part determination unit. Here, the number of samples stored in a packet is N, and the predetermined number of N is stored in a memory or the like of the multiplexer 960.

First, when the first analysis unit 963 obtains a video sample (S901) and outputs the video sample header information to the packetization part determination unit 967, the packetization part determination unit 967 adds a video sample header information to a packet generation table (S902).

Next, the packetization part determination unit 967 updates the number of video samples included in the packet (S903) and judges whether the number of the video samples included in the packet becomes N or not (S904).

Here, the above-mentioned processing from S901 to S903 is repeated in the case where the number of video samples included in the packet does not reach N (No in S904), and the packetization part determination unit 967 packetizes N video samples to finish the processing operation (S905).

Likewise, the packetization part determination unit 967 packetizes the audio samples by performing the processing operation of the above-mentioned S901 to S905.

After that, the packetization part determination unit 967 repeats the processing operation of this flow until all the samples have been packetized.

FIG. 10 shows an example of the packet generation table that stores the header information items of the conventional video samples. This packet generation table 968a describes, for each of the video samples, the sizes of samples, the sample playback durations, or the information related to the intra coded frame flags showing whether the video samples are intra frames or not. Here, the leading video sample stored in the packet shows that the size is 300 bytes, the playback duration is 30 ms, and that it is not the intra coded frame. And, the second video sample shows that it is the intra coded frame. In addition, this packet generation table 968a is outputted to the packet generation table storage unit 968 at the time when these information items are added in sequence in the packetization part determination unit 967 until "N"th sample that is the sample included in a packet is generated.

Referring to FIG. 8 again, next, the packetization part determination unit 967 describes the header information items of N samples in the packet generation table 968a, and then it outputs the packet generation table 968a to the packet generation table storage unit 968 and a packet generation signal to the packet header generation unit 969.

The packet header generation unit 969, when obtaining the packet generation signal, reads out the packet sample header information from the packet generation table 968a that is held in the packet generation table storage unit 968 and generates moof data. Also, the packet header generation unit 969 outputs the generated moof data to the packet connection unit 971 and outputs, to the packet data generation unit 970, the mdat information including i) pointer information indicating which parts of the first data storage unit 962 and the second data storage unit 965 store the entity data items of samples included in the packet and (ii) the size information items of samples.

The packet data generation unit 970 reads out the entity data items of samples from the first data storage unit 962 and the second data storage unit 965 based on the obtained mdat information so as to generate mdat data and outputs the mdat data to the packet connection unit 971.

After that, the packet connection unit 971 connects the moof data with the mdat data so as to output the data in the mp4 extension part for a single packet.

Finally, the outputted mp4 extension data for a single packet is captured into an apparatus that generates the MP4 file and the data of the mp4 extension part that is generated in sequence are arranged in sequence so that the extension part of the MP4 file is generated. After that, this file generation apparatus connects the basic part with the extension part of the MP4 file so as to generate an MP4 file.

However, at the time when the extension part of the MP4 file that is multiplexed by the conventional multiplexer like this is played back, there are problems listed below.

As a conventional demultiplexer multiplexes data without considering the playback start time of samples included in the packet, there is a case where an audio sample that is synchronized with the video sample which has certain playback time is stored in a packet that is different from the packet in the case of video samples. Therefore, this is the cause of a problem that the efficiency of the data access in playing back an MP4 file by the playback apparatus deteriorates.

Also, as a conventional multiplexer multiplexes data based on the number of samples included in a packet, randomly-accessible samples, that is, video samples corresponding to intra frames are respectively stored in a different part of the packet, packet by packet in most cases. Therefore, there is a problem that the calculation amount needed for searching samples becomes huge because the MP4 file playback apparatus must search all the video samples included in a packet when searching randomly-accessible samples.

These problems will be explained in detail with reference to FIG. 11.

FIG. 11 is a diagram for explaining problems of a conventional multiplexer.

FIG. 11A illuminates the first problem that the efficiency of the data access deteriorates during the playback.

The header information items of samples included in respective mdat are stored in each moof immediately before each mdat, the header information item concerning the video sample of playback start time 20s stored in mdat_1 is stored in moof_1 as the leading sample and the header information item concerning the audio sample of the playback time 20s stored in mdat_10 is stored in moof_10 as the last sample.

Therefore, the MP4 file playback apparatus must search data up to moof_10 during the time period of obtaining the header information items of video samples stored in moof_1 to obtain the header information items of audio samples when trying to play back the part of 20 seconds in the playback time of a content, which makes the efficiency of the data access deteriorate.

FIG. 11B illuminates the second problem that the calculation amount needed for searching randomly-accessible samples becomes huge.

The header information item concerning the "i"th randomly-accessible video sample stored in the last part of the mdat_1 is stored as the last sample in moof_1, and the header information concerning the "i+1"th randomly-accessible video sample that is stored in the last part of the mdat_3 is stored as the last sample in moof_3.

Therefore, the MP4 file playback apparatus must search up to the last sample of moof when trying to perform random access, and thus the calculation amount necessary for searching becomes huge.

Further, in addition to the first and the second problems, as the number of seeks for obtaining the sample data becomes many under the structure of the extension part of the MP4 file that is generated in the conventional multiplexer, there is another problem that this is not appropriate for the random access playback in an apparatus which has a slow seek speed such as an optical disc playback apparatus.

This problem will be explained with reference to FIG. 11B again. In the case of trying to perform random access to the "i"th randomly-accessible video sample of moof_1, the playback apparatus moves a reading pointer to the leading point of moof_1 in order to obtain the header information item of the "i"th randomly-accessible video sample first and then analyzes data in moof_1 in sequence. At this time the first seek becomes necessary.

After that, the playback apparatus obtains the information as to which part of mdat_1 stores the entity data of the "i"th randomly-accessible video sample and moves the reading pointer to the starting position of the entity data. At that time, as the entity data of the "i"th randomly-accessible video sample is stored in the end of mdat_1, it is impossible to obtain the entity data of a sample by moving the reading pointer in sequence from the leading position of moof_1, and thus the second seek becomes necessary.

In other words, as respective seek operations are performed at the time of moving the reading pointer to the leading location of moof_1 and to the starting position of the entity data, it takes a lot of time to perform random access playback in the case where the playback apparatus has a slow seek speed. Especially, in the case where the entity data item of an audio sample or the like that is synchronized with the "i"th randomly-accessible video sample is stored in a place such as a different packet away from the entity data of the video sample, additional seek operation becomes necessary and it is impossible to perform an immediate random access playback.

The present invention is conceived considering these problems, and an object of the present invention is to provide a multiplexer which has a high efficiency of data access at the time of playing back a multiplexed media data file and which can multiplex media data so that the calculation amount needed for searching samples can be reduced.

Also, another object is to provide a multiplexer which can multiplex media data so that an apparatus with a slow seek speed can perform random access playback of a multiplexed file.

Further, another object is to obtain the file multiplexed by the multiplexer and provide a demultiplexer which can demultiplex the multiplexed file.

BRIEF SUMMARY OF THE INVENTION

In order to achieve the above-mentioned object, the multiplexer in the present invention generates multiplexed data by multiplexing packets of media data including image data and at least one of audio data and text data, comprising: a media data obtainment unit operable to obtain the media data; an analysis unit operable to analyze the media data obtained by the media data obtainment unit and obtain playback start time information that indicates a playback start time of a sample that is a smallest access unit of the image data, audio data and text data included in the media data; a packetization part determination unit operable to determine, based on the playback start time information obtained by the analysis unit, a packetization part of the media data in a way that playback start times of respective samples of the image data, audio data and text data that are included in the media data are made to be the same or approximately the same; a packet header part generation unit operable to generate a packet header part that holds a header of the media data on a basis of the packetization part determined by the packetization part determination unit; a packet data part generation unit operable to generate a packet data part that holds entity data of the media data on a basis of the packetization part determined by the packetization part determination unit; and a packetization unit operable to generate a packet by connecting the packet header part generated by the packet header part generation unit with the packet data part generated by the packet data part generation unit.

In this way, playback start times of image data, audio data and text data that are included in the media data become the same or approximately the same and stored in the packet, which makes it possible to improve the data access efficiency of the playback apparatus in playback.

Also, in the multiplexer in the present invention, the image data is video data, and the analysis unit further analyzes the video data obtained by the media data obtainment unit and obtains intra frame information in the case where the video data includes at least one sample including the intra frame information indicating that the sample is an intra coded sample, the packetization part determination unit determines the media data as the packetization part based on the intra frame information and the playback start time information in the case where the analysis unit obtains the intra frame information and preferably place the sample of the video data including the intra frame information in the leading part of the packetization part.

In this way, as the leading video sample included in a packet becomes the video sample of an intra frame, it is possible to widely reduce the calculation amount needed for searching samples when the playback apparatus performs random access.

Further, in the multiplexer in the present invention, the packet data part generation unit preferably generates the packet data part for storing samples of the media data items included in the packetization part by interleaving in a way that the playback start times of the samples are in an ascending order.

In this way, as the playback start times of the video samples and the audio samples are stored in mdat in an ascending order, it is possible to reduce the number of seek operations when the playback apparatus performs random access, which enables a playback apparatus with a slow seek speed can realize an immediate random access playback.

Note that the present invention can be realized not only as a multiplexer like this but also as a multiplexing method regarding these characteristic units of the multiplexer like this as steps or as a program that causes a computer to execute these steps. After that, the program like this can be distributed via a recording medium such as a CD-ROM or a communication medium such as the Internet.

BRIEF DESCRIPTION OF THE DRAWINGS

FIG. 2 is a diagram for explaining the basic part of the conventional MP4 file;

FIG. 10 is a diagram showing an example of a packet generation table that stores a header information item of a conventional video sample;

FIG. 16A is a diagram showing the first example of the data structure of the MP4 file extension part generated by the multiplexer;

FIG. 16B is a diagram showing the second example of the data structure of the MP4 file extension part generated by the multiplexer;

FIG. 20A is a diagram showing the first example of the data structure of the MP4 file extension unit generated by the multiplexer;

FIG. 20B is a diagram showing the second example of the data structure of the MP4 file extension unit generated by the multiplexer;

DETAILED DESCRIPTION OF THE INVENTION

Embodiments in the present invention will be explained with reference to figures below.

Note that MPEG-4 Visual coded data is used as the video data in the first embodiment and the MPEG-4 Audio coded data is used as the audio data in the first embodiment. After that, the first embodiment mainly explains the apparatus that multiplexes video data and audio data, but there is no intention of eliminating multiplexing other media data such as text data.

First Embodiment

First, the multiplexer in the first embodiment of the present invention will be explained with reference to FIG. 12 to FIG. 16.

Figure 1:
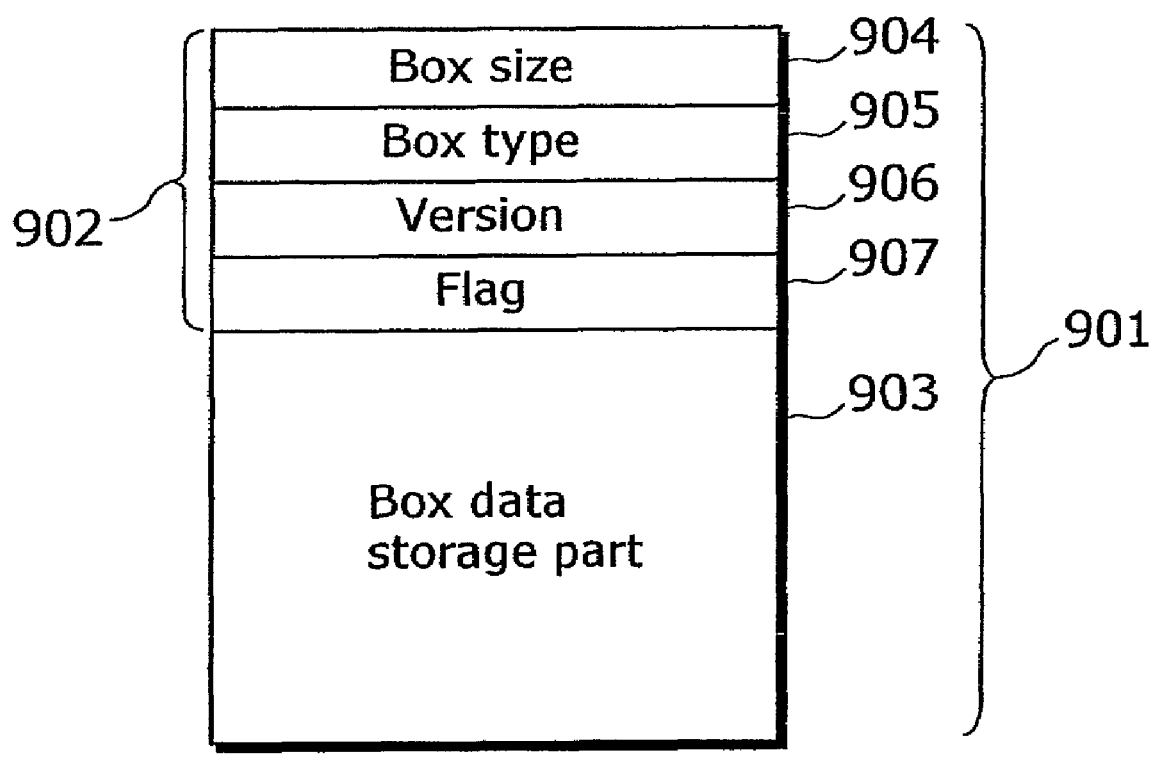
FIG. 1 is a diagram for explaining the structures of boxes that constitute a conventional MP4 file.
Figure 3A:
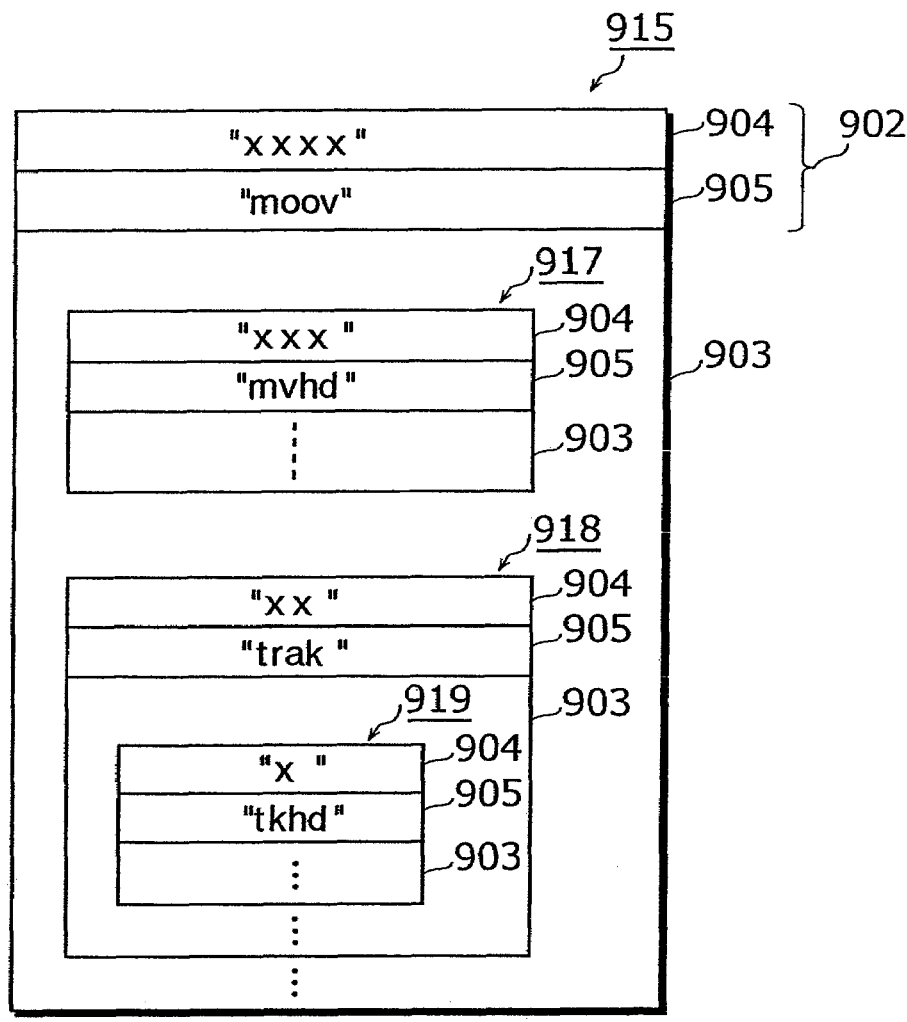
FIG. 3A is a diagram for explaining the structure of a movie box in the conventional MP4 file.
Figure 3B:
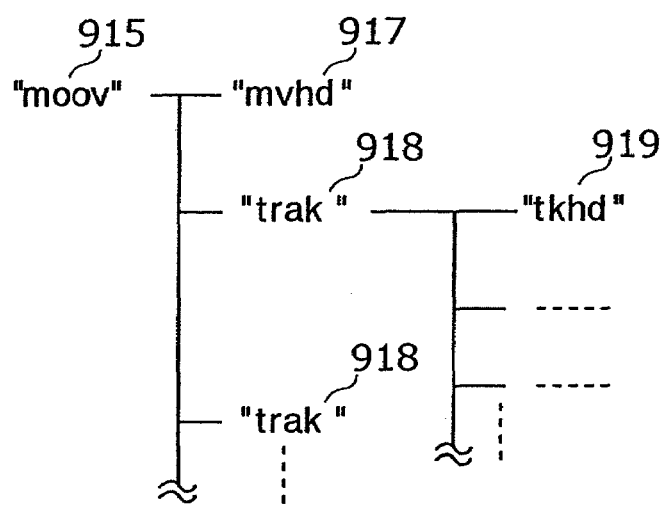
FIG. 3B is a tree-shaped diagram showing the structure of the movie box in the conventional MP4 file.
Figure 4:
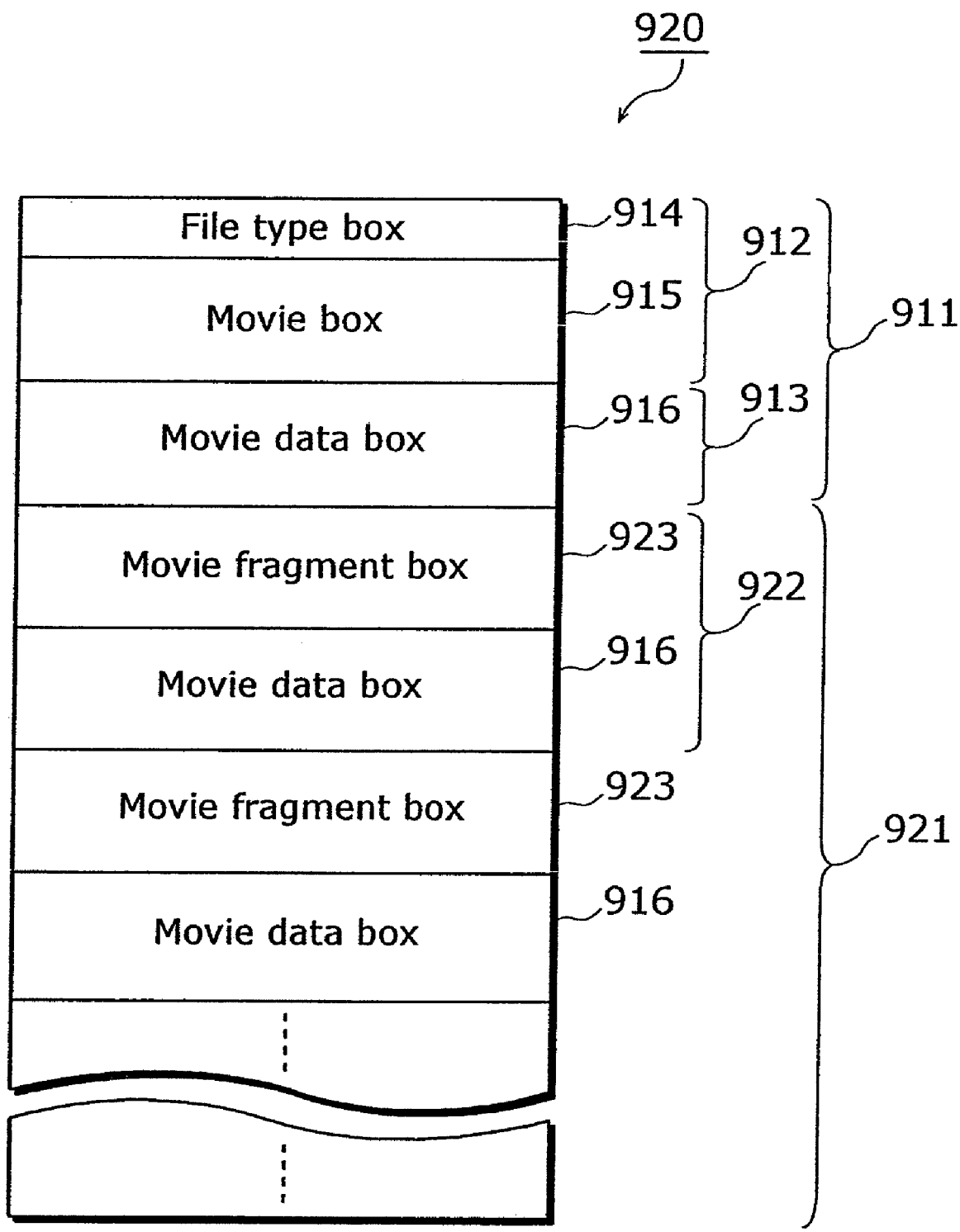
FIG. 4 is a diagram showing the structure of the MP4 file including the conventional extension part.
Figure 5:
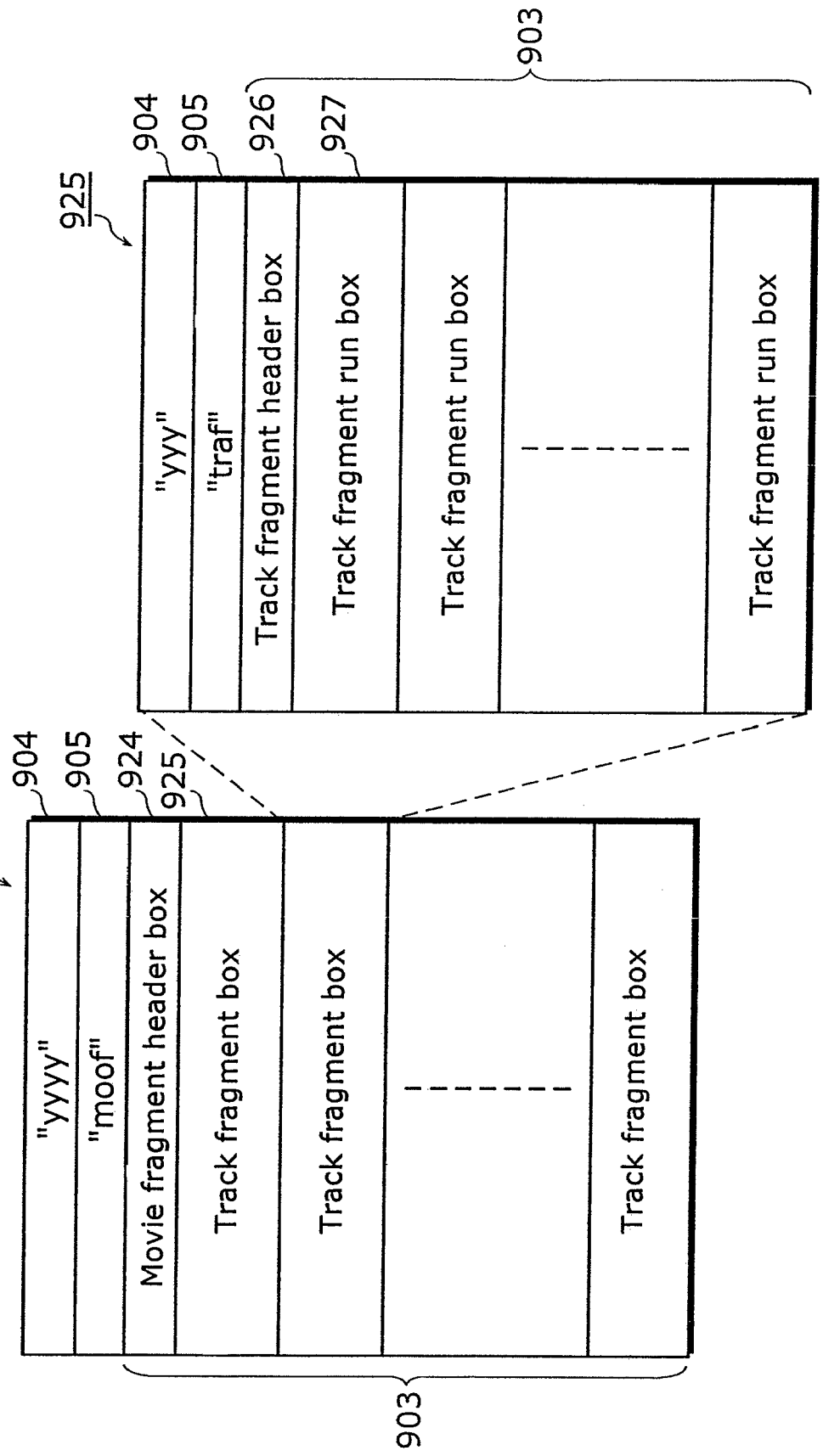
FIG. 5 is a diagram for explaining the structure of the conventional movie fragment box.
Figure 6:
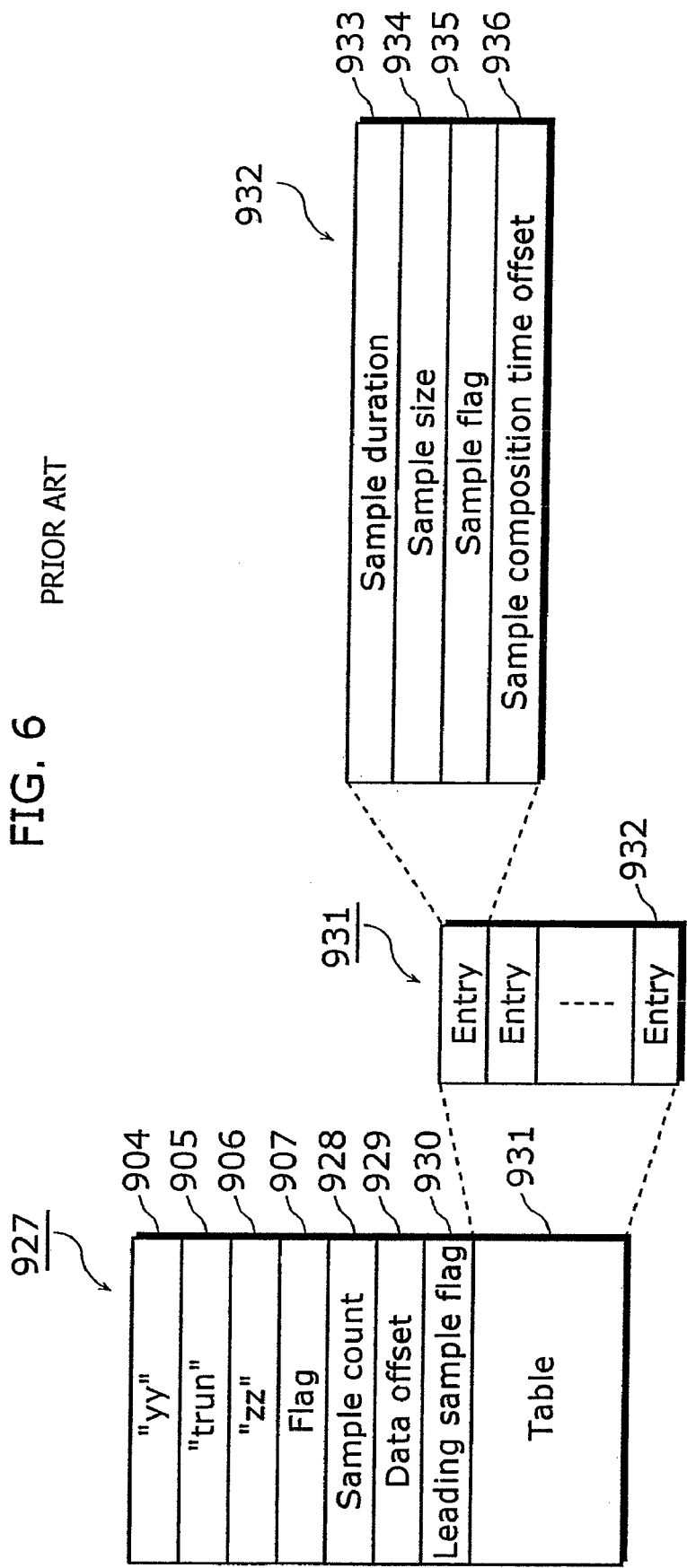
FIG. 6 is a diagram for explaining the structure of a conventional track fragment run box.
Figure 7B:
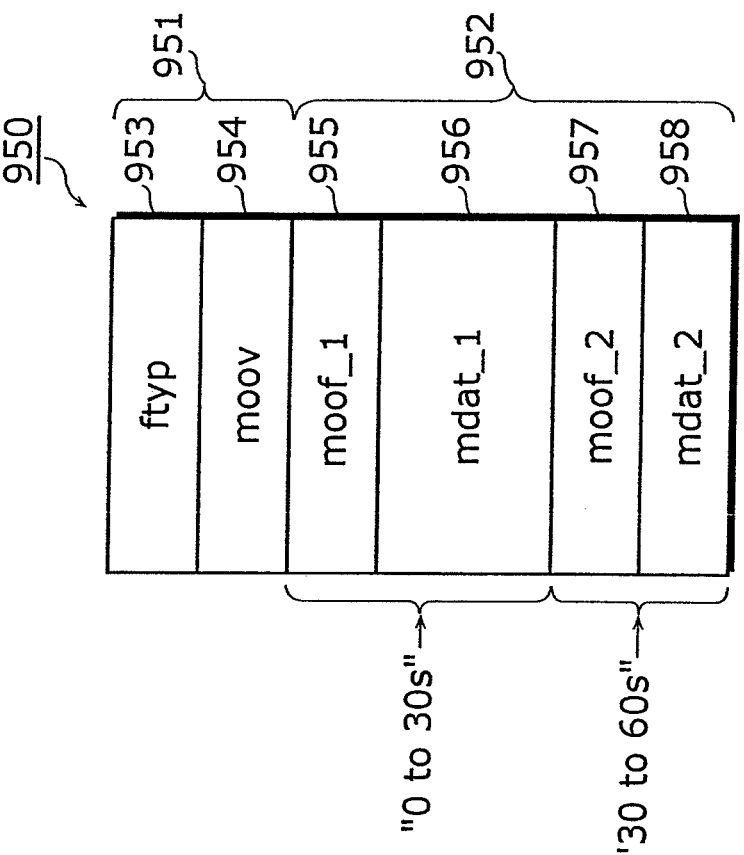
FIG. 7B is a diagram showing the second structural example of the MP4 file including the conventional extension part.
Figure 7A:
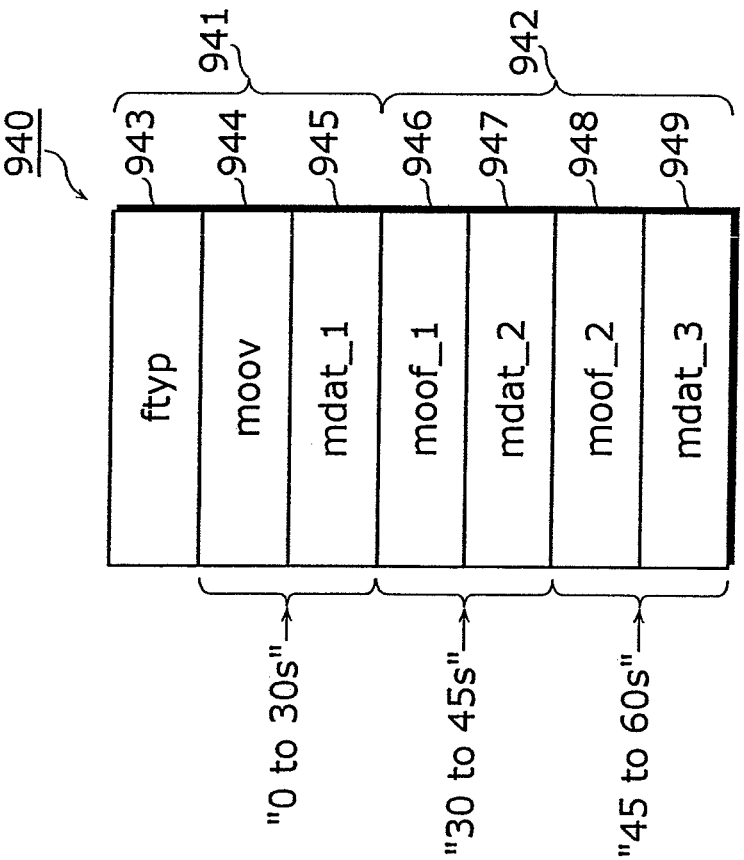
FIG. 7A is a diagram showing the first structural example of the MP4 file including the conventional extension part.
Figure 8:
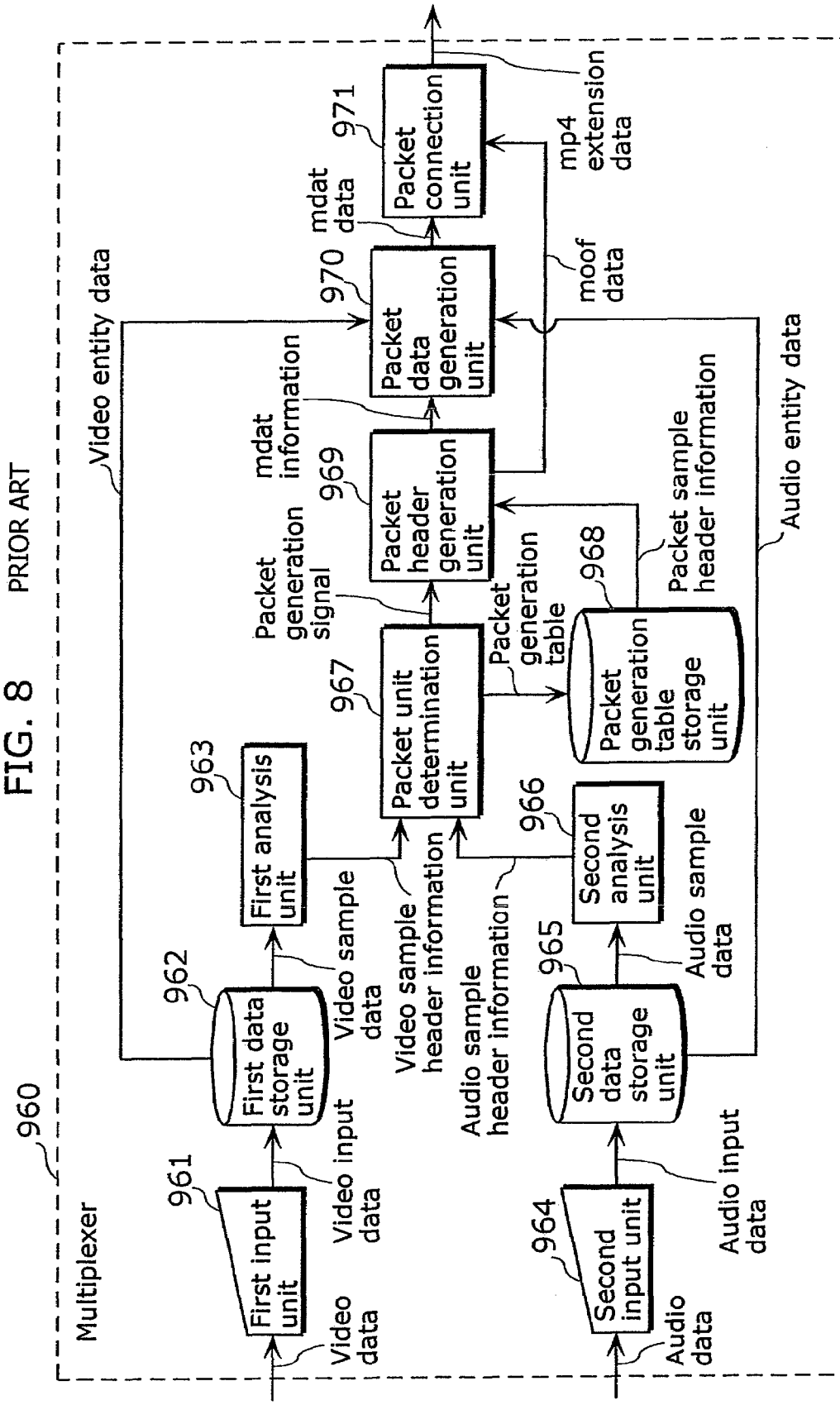
FIG. 8 is a block diagram showing the structure of the conventional multiplexer.
Figure 9:
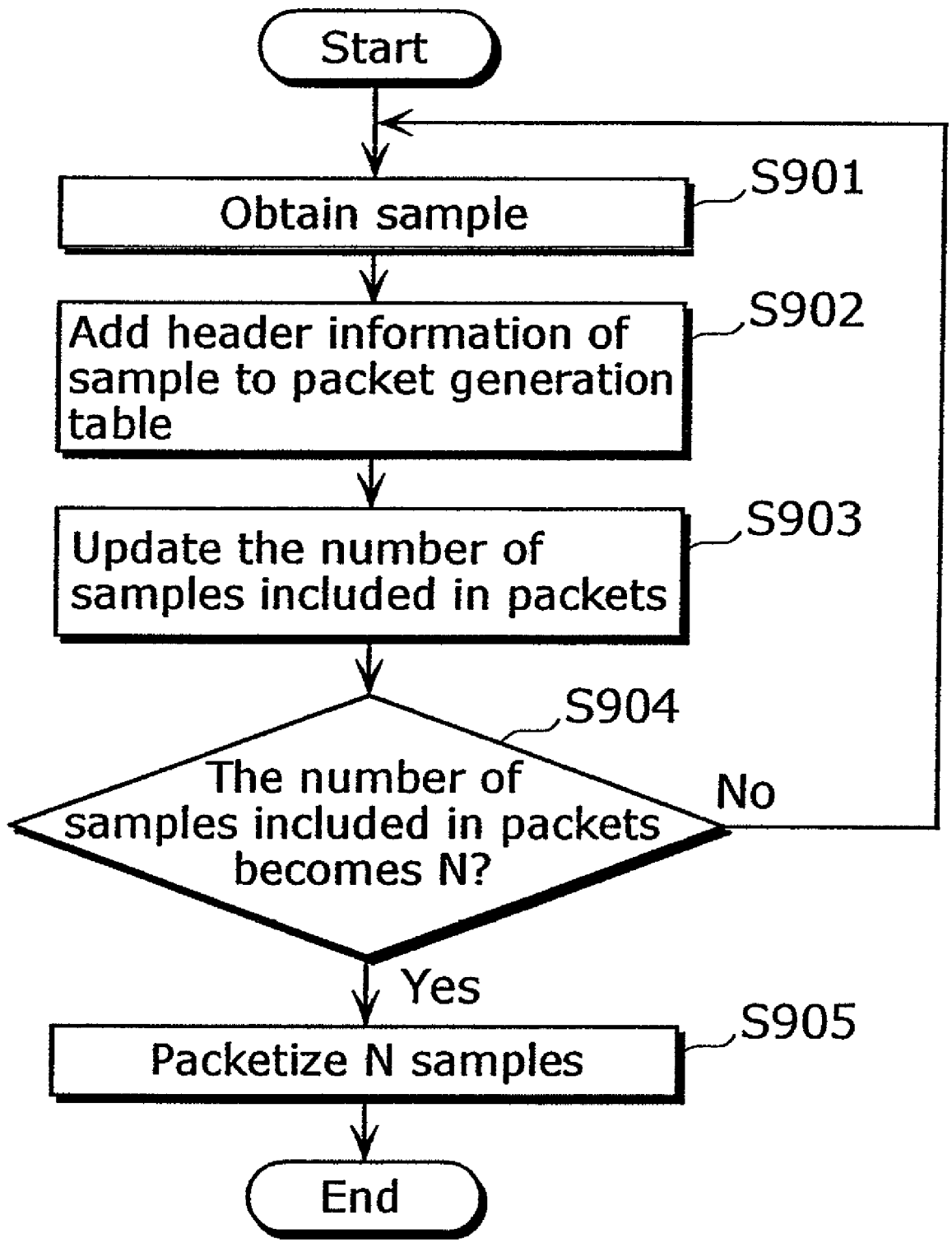
FIG. 9 is a flow chart showing the processing operation of a conventional packet unit determination unit.
Figure 11A:
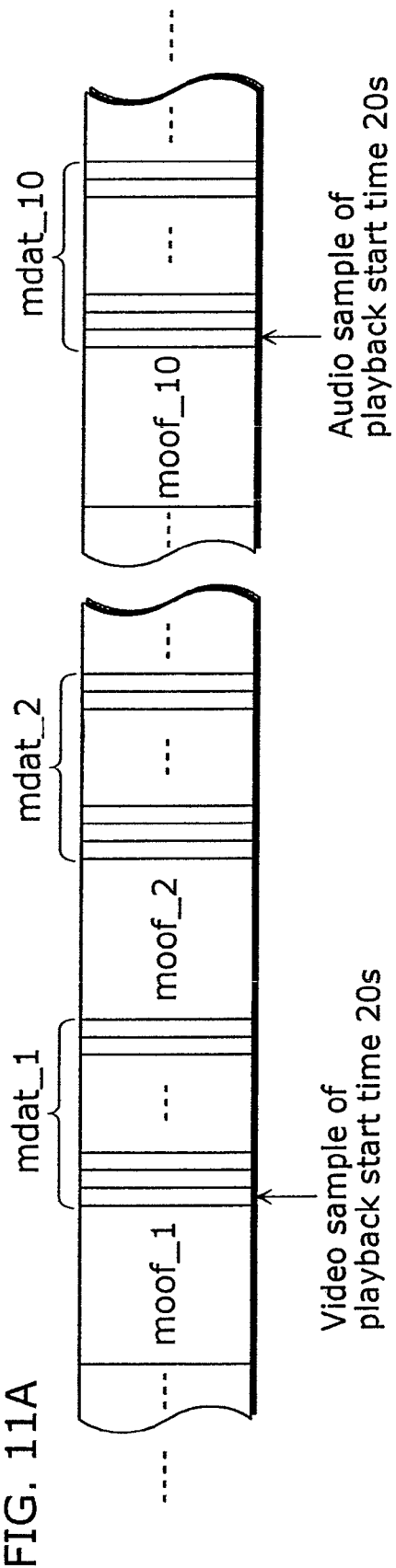
FIG. 11A is a diagram for explaining the first problem of the conventional multiplexer.
Figure 11B:
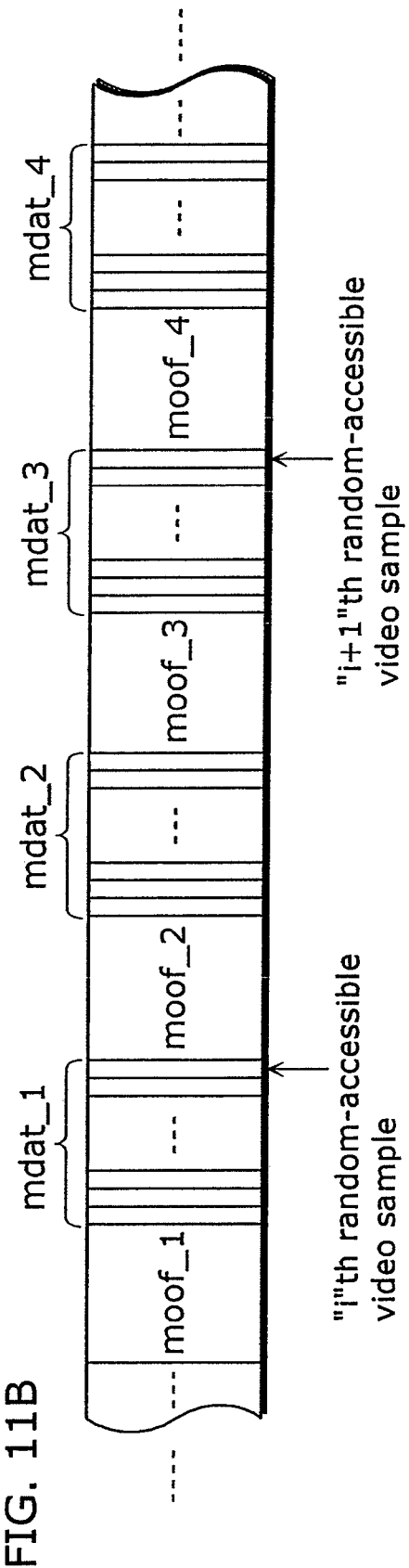
FIG. 11B is a diagram for explaining the second problem of the conventional multiplexer.
Figure 12:
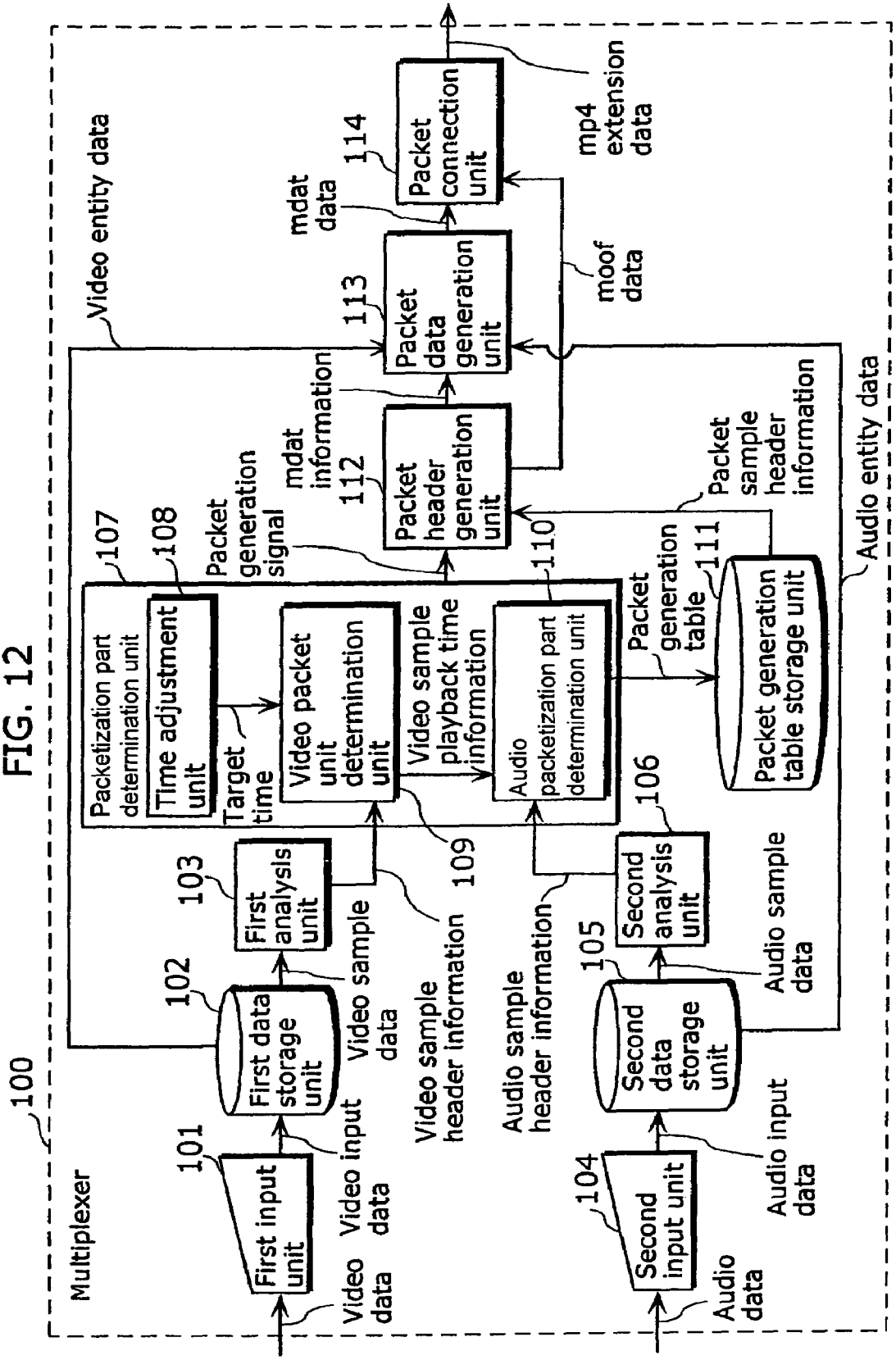
FIG. 12 is a block diagram showing the functional structure of the multiplexer in the first invention of the present invention.

FIG. 12 is a block diagram showing the functional structure of the multiplexer in the first embodiment of the present invention.

This multiplexer 100 is an apparatus that generates the MP4 file that contains an extension part by multiplexing video data or audio data, and includes the first input unit 101, the first data storage unit 102, the first analysis unit 103, the second input unit 104, the second data storage unit 105, the second data analysis unit 106, a packetization part determination unit 107, a packet generation table storage unit 111, a packet header generation unit 112, a packet data generation unit 113 and a packet connection unit 114.

The first input unit 101 is an interface that captures the coded video data in the image coding apparatus or the like and puts it into the multiplexer 100, and has the first data storage unit 102 to store the obtained video input data items in sequence.

The first data storage unit 102 is a cache memory, a random access memory (RAM) or the like that temporally stores the video input data.

The first analysis unit 103 is a processing unit that reads out the video sample data that is the data of a single video sample among video input data items stored in the first data storage unit 102 and analyzes these video input data items and outputs the header information of the video sample, and the first analysis unit 103 is realized in a form of a CPU or a memory. Note that the header information of the video sample outputted in this first analysis unit 103 includes the size of a video sample, the playback duration and the information indicating whether it is an intra frame or not. Further, the header information of this video sample includes the differential information between the decoding time and the display time in the case where it is the sample using inter prediction.

The second input unit 104 is an interface that captures the coded audio data in the audio coding apparatus or the like and puts the coded audio data into the multiplexer 100, and it has the second data storage unit 105 to store the obtained audio input data items in sequence.

The second data storage unit 105 is a cache memory, RAM or the like that temporally stores the audio input data.

The second analysis unit 106 is a processing unit that reads out the audio sample data that is the data of a single audio sample among audio input data items stored in the second data storage unit 105 and analyzes these audio input data items and outputs the header information of the audio sample, and the second analysis unit 106 is realized in a form of a CPU or a memory. Note that the header information of the audio sample outputted in this second analysis unit 106 includes the size of an audio sample and the information indicating the playback duration.

The packetization part determination unit 107 is a processing unit that determines the packetization part of the video data and the audio data in a way that the playback start time of the video sample included in a packet becomes the same or approximately the same as the playback start time of the audio sample by integrating video sample included in the packet and the header information of the audio sample, and is realized in a form of a CPU or a memory. Also, the packetization part determination unit 107 outputs the collection of sample header information items for a determined packetization part to the packet generation table storage unit 111 as a packet generation table, and outputs, to the packet header generation unit 112, a packet generation signal that instructs generating packet headers after the packetization part is determined. After that, this packetization part determination unit 107 includes a time adjustment unit 108 that adjusts packetization parts by the total duration of samples in a packet, a video packetization part determination unit 109 that determines packetization packets of video data and an audio packetization part determination unit 110 that determines packetization parts of audio data.

The time adjustment unit 108 is a processing unit that adjusts the end time of a packet so that the packet finishes within a predetermined time unit. This time adjustment unit 108 outputs a predetermined time (target time) to the video packetization part determination unit 109 first. Note that a user may specify this target time. In this case, the multiplexer 100 obtains a specification of the target time via the input apparatus such as keyboards, and outputs a target time input signal showing the target time specified via the input apparatus to the time adjustment unit 108.

The video packetization part determination unit 109 is a processing unit that obtains the video sample header information from the first analysis unit 103 and determines the packetization part of the video data.

This video packetization part determination unit 109 obtains a target time from the time adjustment unit 108, video sample header information from the first analysis unit 103, and adds header information items up to the header information item of the last video sample included in a packet counting the playback duration of each video sample included in each of the video sample header information items in a way that the video data finishes in a packet within the target time. The video packetization part determination unit 109 adds the header information item of the last video sample included in the packet and outputs the video sample playback time information showing the total of the playback start time of the first video sample included in the packet and the playback duration of the video sample included in the packet to the audio packetization part determination unit 110.

The audio packetization part determination unit 110 is a processing unit that obtains the audio sample header information obtained from the second analysis unit 106 and determines the packetization part of the audio data.

This audio packetization part determination unit 110 obtains the video sample playback time information from the video packetization part determination unit 109 and the audio sample header information from the second analysis unit 106, places, at the leading part of the packet, the audio sample of the playback start time that is the same or approximately the same as the playback start time of the leading video sample included in the packet, and places the last audio sample included in the packet so that the total of the playback durations of the audio samples included in the packet becomes the same or approximately the same as the total of the playback durations of the video samples included in the packet counting the playback duration of each audio sample included in each audio sample header information item.

Note that an audio sample of the playback start time that is the same or approximately the same as the playback start time of the video sample is the audio sample of the earliest playback start time after the playback start time of the video data, or the audio sample of the last playback start time before the playback start time of the video sample.

After that, the audio packetization part determination unit 110 adds header information items of the audio samples from the leading audio sample to the last audio sample included in the packet, to the audio packet generation table in sequence.

The packet generation table storage unit 111 is a cache memory, a RAM or the like that temporally stores a video packet generation table and an audio packet generation table that are outputted from the packetization part determination unit 107.

The packet header generation unit 112 is the processing unit that generates a packet header part (moof) that stores a header information item of a packet, and is realized as a CPU or a memory.

This packet header generation unit 112 obtains a packet generation signal from the packetization part determination unit 107, reading out packet sample header information from the packet generation table storage unit 111 referring to the packet generation table so as to generate moof data and outputs it to the packet connection unit 114.

Also, the packet header generation unit 112 outputs, to the packet data generation unit 113, pointer information showing at which part of the first data storage unit 102 and the second data storage unit 105 the entity data items of the video samples included in a packet and the audio sample are stored, sample size information showing the size of the sample, the mdat information including a signal that instructs generating a packet data unit (mdat).

Note that, this packet header generation unit 112 can store header information items of media data coded using a coding method such as advanced multi rate CODEC (AMR) where the coded rate is switched in the middle of the data in a different traf depending on a coded rate at the time of generating moof.

The packet data generation unit 113 is the processing unit that generates a packet data part (mdat) where the entity data of a packet is stored and realized as a CPU or a memory.

This packet data generation unit 113 obtains the mdat information from the packet header generation unit 112, reads out the video entity data of the video sample included in a packet from the first data storage unit 102 based on the pointer information included in mdat information and the sample size information, reads out the audio entity data of the audio sample included in a packet from the second data storage unit 105 so as to generate mdat data and outputs the packet connection unit 114.

The packet connection unit 114 is the processing unit that connects moof data with mdat data and generates mp4 extension data for a single packet and realized as a CPU or a memory. This packet connection unit 114 obtains moof data from the packet header generation unit 112, obtains mdat data from the packet data generation unit 113, generates the mp4 extension data for a single packet by connecting moof data with mdat data, and outputs mp4 extension unit data items that are generated in sequence to the apparatus that generates the MP4 file.

The processing procedure of generating an extension unit of an MP4 file in the multiplexer 100 constituted like this will be explained with reference to FIG. 13.

Figure 13:
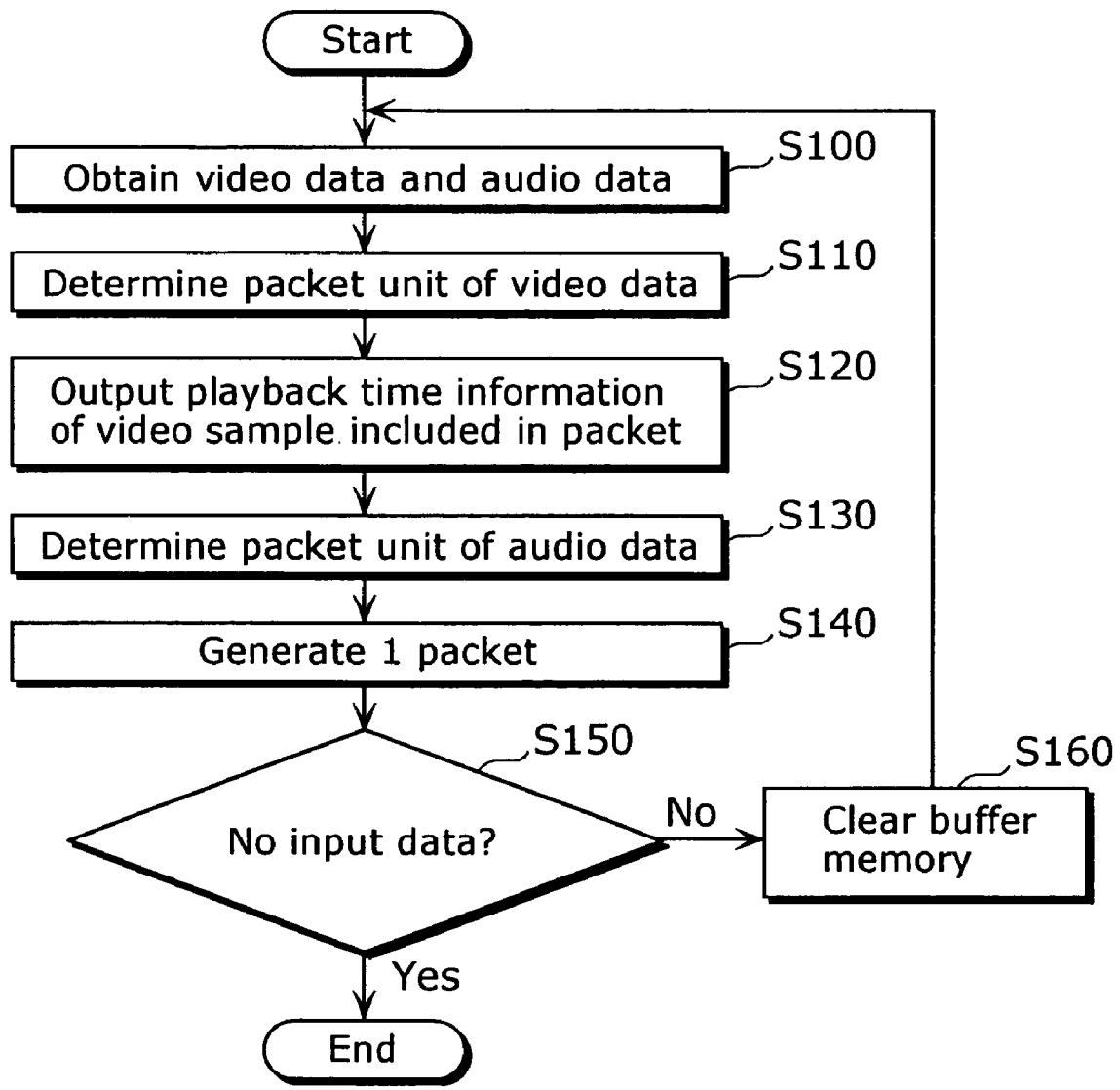
FIG. 13 is a flow chart showing the processing operation of the multiplexer.

FIG. 13 is a flow chart showing the processing operation of the multiplexer 100.

First, the first input unit 101 and the second input unit 104 read video data and audio data in the multiplexer 100 (S100), the first input unit 101 causes the first data storage unit 102 to store the video input data, and the second input unit 104 causes the second data storage unit 105 store the audio input data.

Next, the first analysis unit 103 reads out the video sample data from the first data storage unit 102 so as to analyze it and outputs the video sample header information to the video packetization part determination unit 109 of the packetization part determination unit 107. After that, the video packetization part determination unit 109 determines the packetization part of the video data based on the video sample header information obtained from the first analysis unit 103 and the target time obtained from the time adjustment unit 108 (S110). Note that the processing operation of determining the packetization part of the video data by the video packetization part determination unit 109 will be explained in detail later.

After that, the video packetization part determination unit 109 outputs the playback time information of the video sample included in the packet whose packetization part is determined to the audio packetization part determination unit 110 (S120).

After that, the audio packetization part determination unit 110 determines the packetization part of the audio data based on the playback duration information of the video sample obtained from the video packetization part determination unit 109 (S130). At this time, the audio packetization part determination unit 110 determines the packetization part so that the playback start time of the leading audio sample included in the packet becomes the same or approximately the same as the playback start time of the leading video sample included in the packet.

When the audio packetization part determination unit 110 determines the packetization part of the audio data, the packetization part determination unit 107 outputs a packet generation table to the packet generation table storage unit 111 and outputs a packet generation signal to the packet header generation unit 112.

After that, the packet header generation unit 112 generates moof data on a basis of the determined part so as to output it to the packet connection unit 114. The packet data generation unit 113 generates mdat data on a basis of the determined part so as to output it to the packet connection unit 114. The packet connection unit 114 connects moof data with mdat data so as to generate a single packet on a basis of the determined part (S140) and outputs it as mp4 extension data for a single packet.

After generating the packet, the multiplexer 100 judges whether data to be inputted is left in the first input unit 101 and the second input unit 104 (S150). Here, in the case where there is input data (No in S150), the multiplexer 100 clears the data that has already been packetized among data stored in the buffer memory, that is the first data storage unit 102, the second data storage unit 105 and the packet generation table storage unit 111 (S160) and repeats the processing operation from the above-mentioned S110 to S150.

On the other hand, in the case where there is no input data (Yes in S150), the multiplexer 100 finishes the generation processing of the extension part of the MP4 file.

In this way, the multiplexer 100 determines the packetization part of the audio data after determining the packetization part of the video data first and generates the extension part of the MP4 file by multiplexing the media data.

Here, in the step S110 in FIG. 13, the processing operation of determining the packetization part of the video data by the video packetization part determination unit 109 will be explained in detail.

Figure 14:
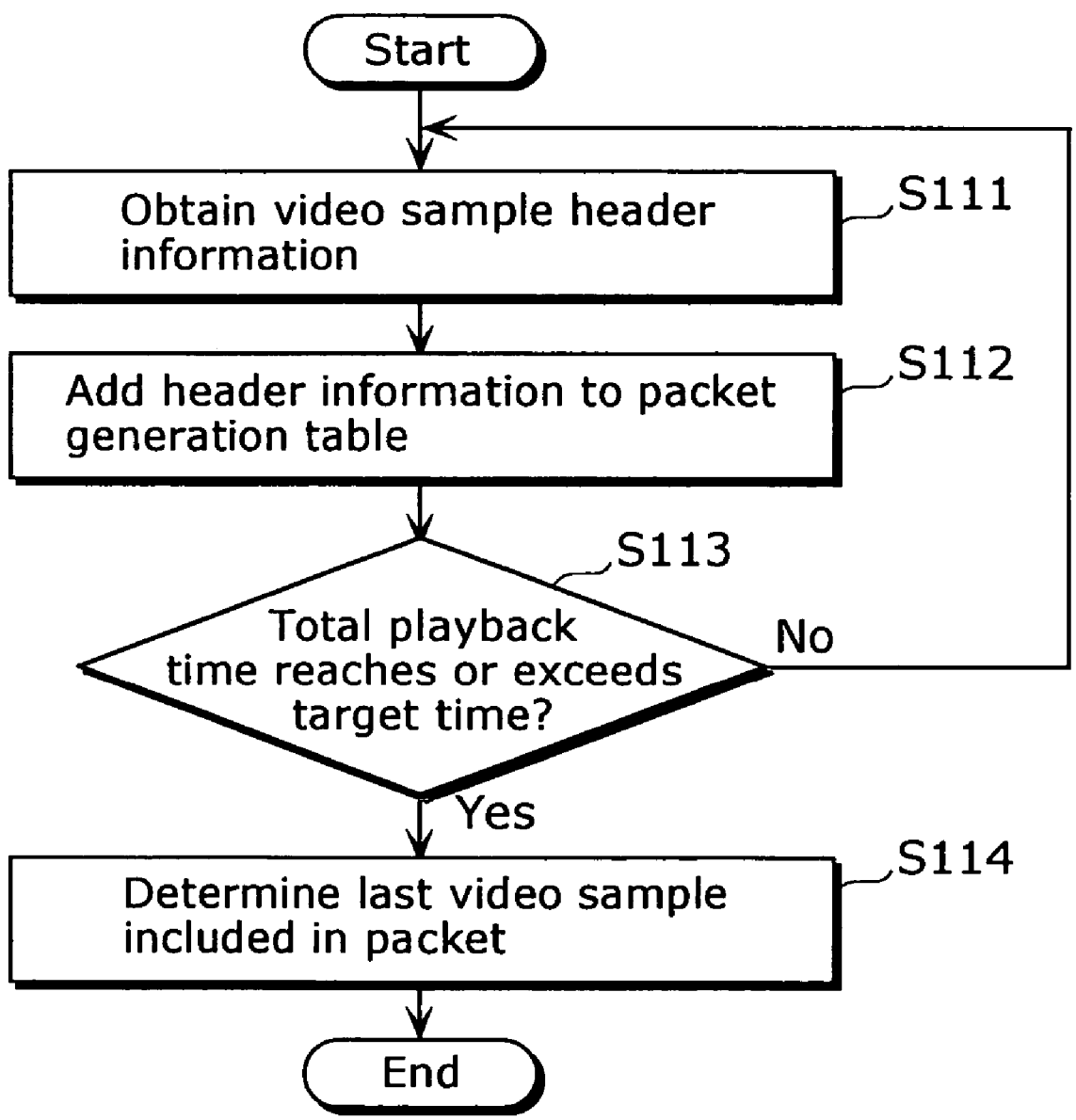
FIG. 14 is a flow chart showing the processing operation of a video packetization part determination unit.

FIG. 14 is a flow chart showing the processing operation of the video packetization part determination unit 109.

The video packetization part determination unit 109 obtains the target time from the time adjustment unit 108 prior to this flow.

After that, the video packetization part determination unit 109 obtains the video sample header information from the first analysis unit 103 (S111) and adds the video sample header information to the video packet generation table (S112).

At this time, the video packetization part determination unit 109 judges whether the total of the playback durations of the video samples included in the video sample header information items, that is, the total playback durations of the video data included in the packet becomes the previously obtained target time or exceeds the target time or not (S113).

In the case where the total playback durations of the video data included in the packet do not reach the target time (No in S113), the video packetization part determination unit 109 obtains next video sample header information (S111) and repeats the processing operations of S112 and S113.

In the case where the total playback durations of the video data included in the packet reach the target time (Yes in S113), the video packetization part determination unit 109 determines the video sample indicated by the video sample header information that is added to the video packet generation table last as the last video sample included in the packet (S114) and finishes the processing operation of determining a packetization part.

Next, in the step S130 in FIG. 13, the processing operation of determining the packetization part of the audio data by the audio packetization part determination unit 110 will be explained in detail.

Figure 15:
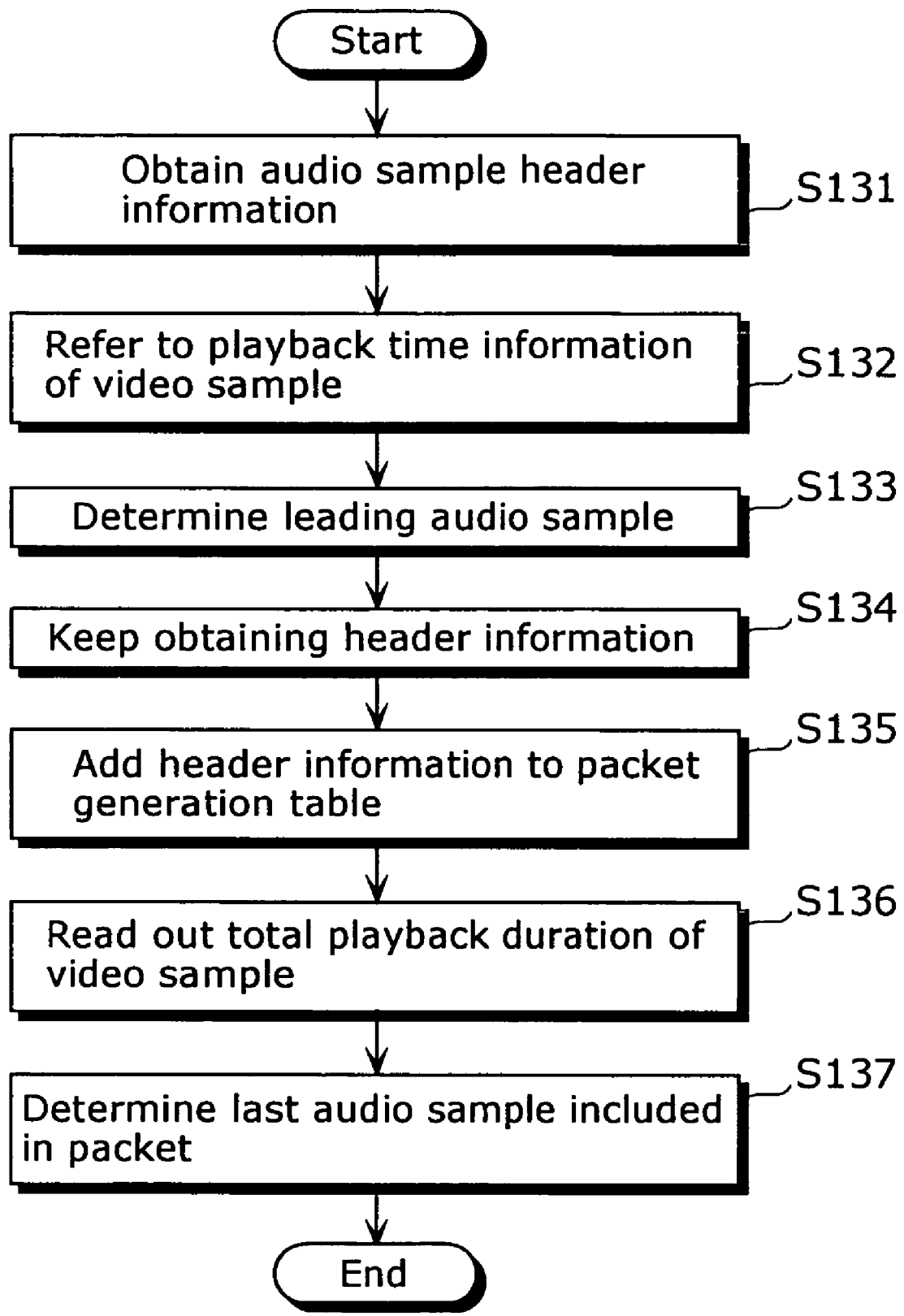
FIG. 15 is a flow chart showing the processing operation of an audio packetization part determination unit.

FIG. 15 is a flow chart showing the operation processing of the audio packetization part determination unit 110.

The audio packetization part determination unit 110 obtains the video sample playback information from the video packetization part determination unit 109 prior to this flow.

After that, the audio packetization part determination unit 110 obtains the audio sample header information from the second analysis unit 106 (S131), refers to the video sample playback duration information that is previously obtained (S132), reads out the playback start time of the leading video sample included in the packet and determines the audio sample of the playback start time that is the same or approximately the same as the playback start time of the leading video sample included in the packet as the audio leading sample of the packet (S133).

The audio packetization part determination unit 110 determines the audio leading sample included in the packet, obtains the audio sample header information items in sequence (S134) and adds the audio sample header information items to the audio packet generation table (S135).

After that, the audio packetization part determination unit 110 reads out the total of the playback durations of the video samples included in the packet by referring to the video sample playback duration information (S136), determines the last audio sample included in the packet so that the total of the playback durations of the audio samples included in the packet becomes the same or approximately the same as the total of the playback durations of the video samples included in the packet (S137) and finishes the processing operation of determining the packetization part.

The extension part of the MP4 file to be generated through the processing operation by the multiplexer 100 like this has excellent data access efficiency at a playback apparatus. The reason will be explained with reference to a data structure example of the MP4 file extension part to be generated by the multiplexer 100 in FIG. 16.

The MP4 file extension part 200 shown in FIG. 16A is made of a plurality of packets and connected to the basic part of the MP4 file.

Each of the packets that constitute the MP4 file extension part 200 is made of moof of the packet header part and mdat of the packet data part. Here, the packet_1 means that it is the first packet of the MP4 file extension part 200, moof included in packet_1 is shown as moof_1, and mdat included in packet_1 is shown as mdat_1. Also, "V" shown in each mdat of FIG. 16A is for indicating a video sample, while "A" shown in each mdat of FIG. 16A is for indicating an audio sample (the same is true of in other figures).

The video sample whose playback start time is 20 seconds is stored in mdat_1 of the MP4 file extension part 200 as a leading video sample, and also the audio sample whose playback start time is 20 minutes is stored in mdat_1 of the MP4 file extension part 200 as a leading audio sample. Also, a video sample whose playback start time is 30 minutes is stored in mdat_2 as a leading video sample, and also an audio sample whose playback start time is 30 minutes is stored in mdat_2 as a leading audio sample.

In this way, storing a video sample and an audio sample in a single packet in a way that their playback start times are made to be the same or approximately the same as each other makes it possible to widely reduce the calculation amount needed for data access at the time of playing back the MP4 file extension part 200 at the playback apparatus side.

Also, as playback start times of each media data are stored in a packet after they are made to be the same or approximately the same as each other, it is possible to adjust the size of the MP4 file data to a desired size.

Here, the MP4 file extension part generated by the multiplexer 100 may be the data structure shown in FIG. 16B.

FIG. 16B is a diagram showing the second example of the data structure of the MP4 file extension part generated by the multiplexer 100.

A video sample whose playback start time is 20 minutes is stored in the mdat_1 of the MP4 file extension part 210 shown in FIG. 16B as a leading video sample, and an audio sample whose playback start time is 20 minutes is stored in mdat_2 as a leading audio sample. Also, a video sample whose playback start time is 30 minutes is stored in mdat_3 as a leading video sample, and an audio sample whose playback start time is 30 minutes is stored in mdat_4 as a leading audio sample.

In this way, storing one of a video data or an audio data in a single packet and alternately arranging a packet storing video data items and a packet storing audio data items whose playback times are made to be the same or approximately the same as each other can widely reduce the calculation amount needed for data access at the time of playing back the MP4 file extension part 200 at the playback apparatus.

As explained up to this point, the multiplexer 100 in this first embodiment can improve the efficiency of data access at the playback apparatus side because respective media data items are packetized after their playback start times are made to be the same or approximately the same as each other.

Second Embodiment

Next, the multiplexer in this second embodiment of the present invention will be explained with reference to FIG. 17 to FIG. 20.

The multiplexer in the second embodiment has the same main units as the multiplexer 100 in the above-mentioned first embodiment, but it differs from the multiplexer 100 in the above-mentioned first embodiment in that it has a unique unit in a packetization part determination unit. This different point will be focused on in the following explanation. Note that the same codes are used for the same units as in the above-mentioned first embodiment and their explanation will be omitted.

Figure 17:
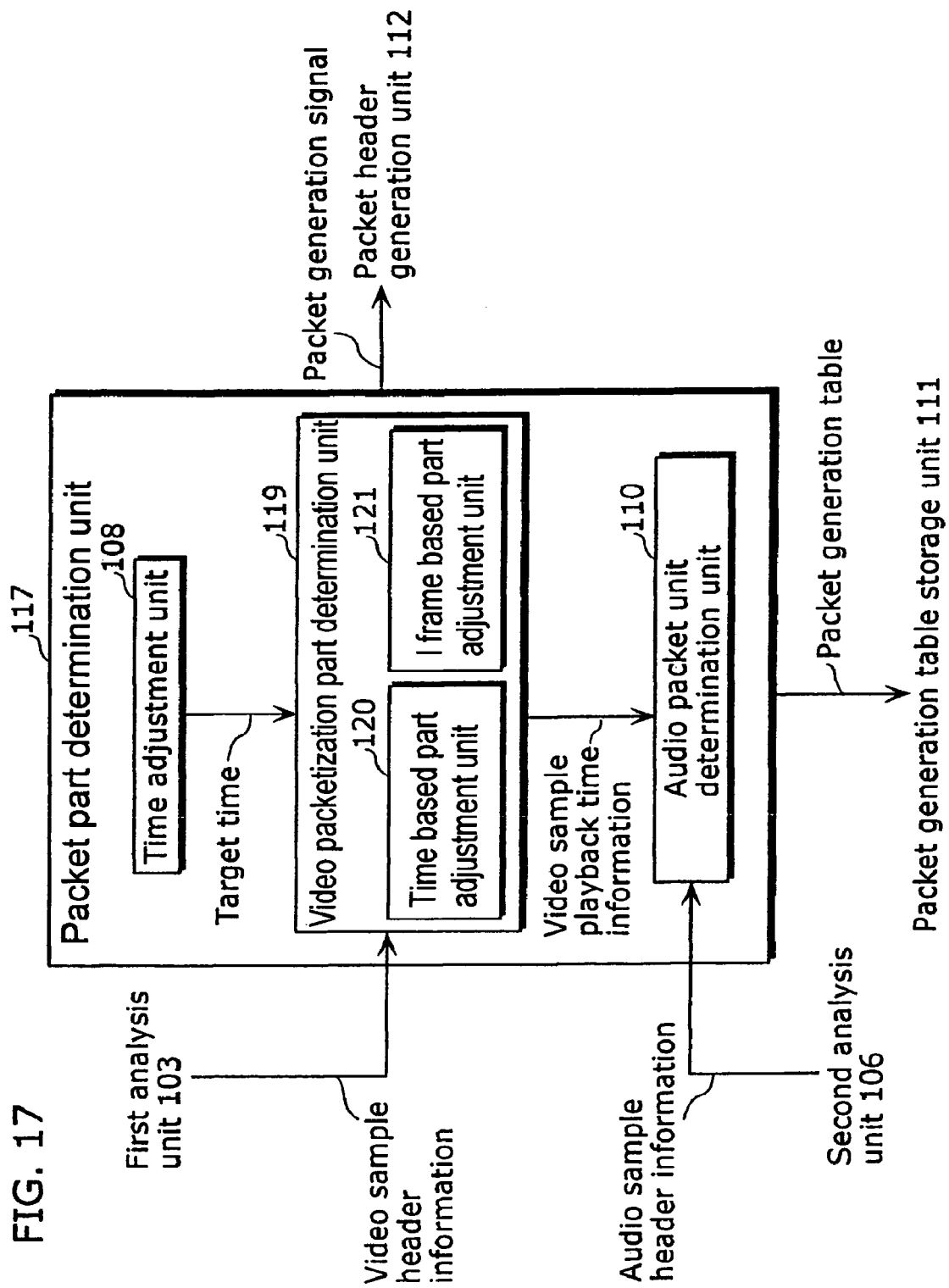
FIG. 17 is a block diagram showing the functional structure of the packetization part determination unit of the multiplexer in a second embodiment.

FIG. 17 is a block diagram showing the functional structure of the packetization part determination unit of a multiplexer in the second embodiment.

This packetization part determination unit 117 is the processing unit that integrates the video sample included in a packet and header information of an audio sample and determines a packetization part of the video data and the audio data in a way that playback start times are made to be the same or approximately the same as each other and the leading video sample included in a packet becomes an intra frame, and includes a time adjustment unit 108, a video packetization part determination unit 119 and an audio packetization part determination unit 110.

The video packetization part determination unit 119 is the processing unit that obtains video sample header information from the first analysis unit 103 and determines a packetization part of video data based on either time or an intra frame, includes a time-based part adjustment unit 120 and an I frame-based part adjustment unit 121.

The time-based part adjustment unit 120 is the processing unit that adjusts a packetization part of video data based on target time outputted from the time adjustment unit 108 and adjusts a packetization part in a way that a packet becomes a predetermined time unit by counting playback durations of respective video sample headers.

The I frame-based part adjustment unit 121 is the processing unit that adjusts a packetization part of video data based on whether the information indicating an intra frame is included in the video sample header information outputted from the first analysis unit 103. The I frame-based part adjustment unit 121 obtains the video sample header information that includes the information indicating an intra frame, switches packetization parts at a video sample of an intra frame, and adjusts the packetization part in a way that the leading video sample of a next packet becomes the video sample of an intra frame.

The processing operation that determines a packetization part of video data by the video packetization part determination unit 119 of the multiplexer in the second embodiment that includes a packetization part determination unit 117 constituted like this will be explained in detail.

Figure 18:
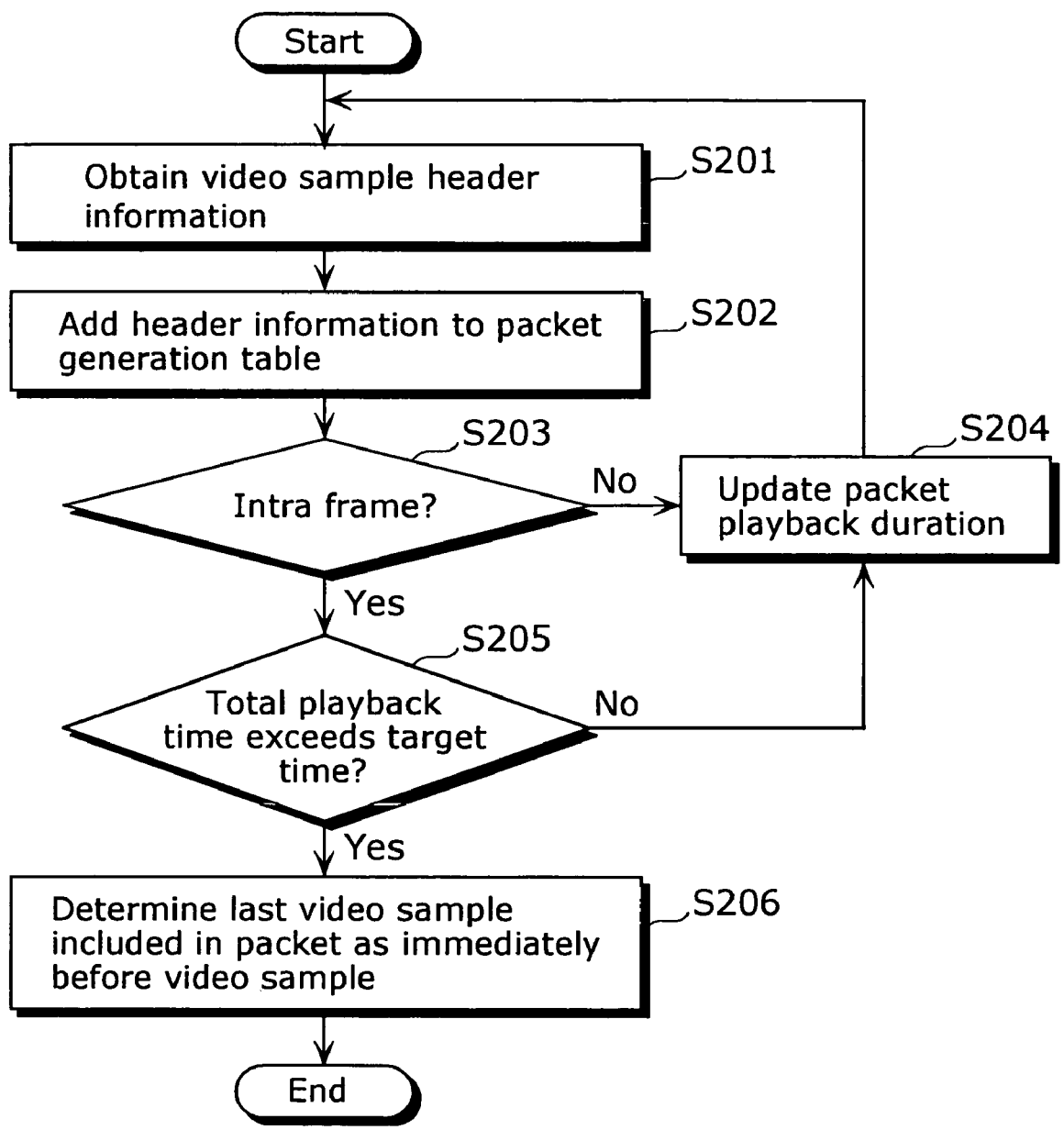
FIG. 18 is a flow chart showing the first processing operation of the video packetization part determination unit.

FIG. 18 is a flow chart showing the processing operation of the video packetization part determination unit 119.

The video packetization part determination unit 119 obtains a target time from the time adjustment unit 108 and stores the time-based part adjustment unit 120 prior to this flow.

After that, as in the above-mentioned first embodiment, the video packetization part determination unit 119 obtains the video sample header information from the first analysis unit 103 (S201) and adds the video sample header information to the video packet generation table (S202).

At this time, the video packetization part determination unit 119 judges whether the information indicating an intra frame is included in the obtained video sample header information in the I frame-based part adjustment unit 121 (S203).

In the case where the information indicating an intra frame is included (Yes in S203), the video packetization part determination unit 119 judges whether the total playback durations of all the video samples included in a packet exceeds the previously obtained target time in the time-based part adjustment unit 120 (S205).

Here, in the case where no information indicating an intra frame is included (No in S203) or in the case where the total durations do not exceed the target time (No in S205), the video packetization part determination unit 119 updates the total of the playback durations of video samples included in the packet by adding the playback duration of the video sample included in the video sample header information in the time-based part adjustment unit 120 (S204), obtains next video sample header information (S201) and repeats the above-mentioned processing operation.

On the other hand, in the case where the total duration exceeds the target time (Yes in S205), the video packetization part determination unit 119 determines the video sample immediately before the video sample judged as an intra frame in the I frame-based part adjustment unit 121 as the last video sample included in the packet (S206) and finishes the processing operation of determining a packetization part of video data.

In the extension part of the MP4 file generated through the processing operation of the video packetization part determination unit 119 like this, playback can be started from the leading video sample of a packet at the time of random access at a playback apparatus side because the video sample stored in the leading part of the packet surely becomes a video sample of an intra frame, and thus it is possible to widely reduce the calculation amount needed for searching a randomly-accessible video sample.

Also, as the video sample stored in the leading part of the packet surely becomes the video sample of an intra frame, only the information indicated as randomly accessible must be described only in the leading sample flag field of trun that is located in the leading part of traf that holds header information of a video track in the packet header part (moof) and respective sample flag fields of the respective trun can be omitted by using default values, and thus the workload at the time of generating moof data is reduced and the size of the whole MP4 file can also be reduced.

Note that the playback duration per a single packet may be long when the space between intra frames included in the video data becomes wide in this processing operation. Therefore, the packetization part determination unit 117 may be the processing operation like described below.

Figure 19:
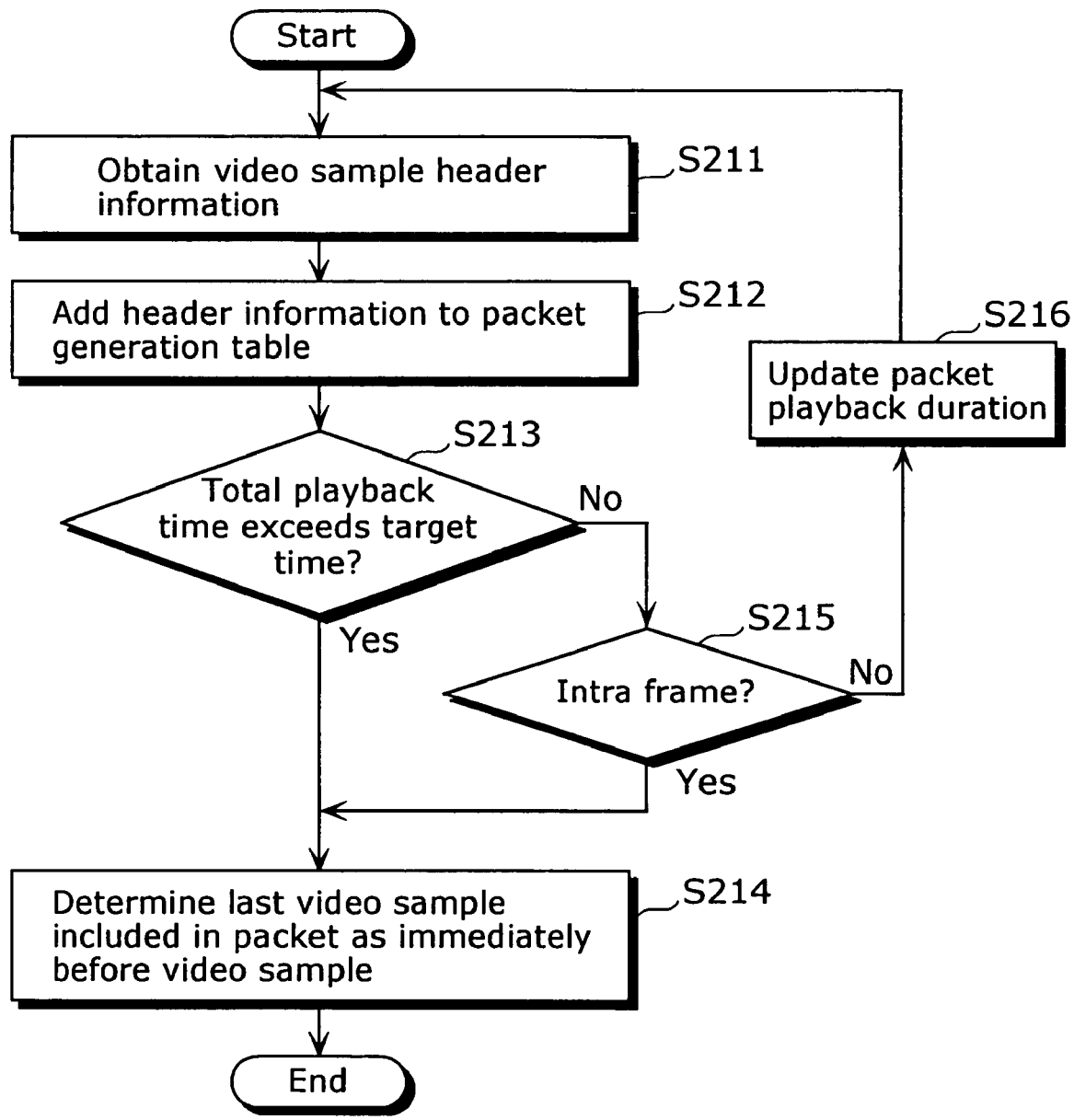
FIG. 19 is a flow chart showing the second processing operation of the video packetization part determination unit.

FIG. 19 is a flow chart showing the second processing operation of the video packetization part determination unit 119.

As in the above-mentioned first processing operation, the video packetization part determination unit 119 obtains target time from the time adjustment unit 108 and stores it in the time-based part adjustment unit 120 prior to this flow.

After that, the video packetization part determination unit 119 obtains the video sample header information from the first analysis unit 103 (S211) and adds the video sample header information to the video packet generation table (S212).

At this time, the video packetization part determination unit 119 judges whether the total playback time of all the samples included in the packet exceeds the target time that is previously obtained in the time-based part adjustment unit 120 (S213).

In the case where the total time exceeds the target time (Yes in S213), the video packetization part determination unit 119 determines the video sample indicated by the video sample header information that is immediately before the video sample header information obtained this time as the last video sample included in the packet (S214) and finishes the processing operation of determining the packetization part of the video data.

On the other hand, in the case where the total time does not exceed the target time (No in S213), the video packetization part determination unit 119 judges whether the information indicating an intra frame is included in the obtained video sample header information in the I frame-based part adjustment unit 121 or not (S215).

Here, in the case where the information indicating an intra frame is included (Yes in S215), the video packetization part determination unit 119 determines, as the last video sample included in the packet, the video sample that is immediately before the video sample that is judged as an intra frame in the I frame-based part adjustment unit 121 (S214) and finishes the processing operation of determining the packetization part of video data.

On the other hand, in the case where no information indicating an intra frame is included (No in S215), the video packetization part determination unit 119 updates the total of playback durations of video sample included in the packet by adding playback durations of video samples included in the video sample header information in the time-based part adjustment unit 120 (S216), obtains next video sample header information (S211) and repeats the above-mentioned processing operation.

The extension part of the MP4 file generated through the second processing operation of the video packetization part determination unit 119 like this can generate packets setting a predetermined time limit so as to keep the packet size within the desired size and, in the case where video samples of intra frames are included, store them in the leading part of the packets, which only requires judging whether only the leading video sample of the packet is the randomly-accessible video sample or not at the time of random access at a playback apparatus side. Thus, it becomes possible to reduce the calculation amount needed for searching randomly-accessible video samples.

Note that, like in the case of the above-mentioned first embodiment, the video packetization part determination unit 119 finishes the processing operation of determining a packetization part of video data, outputs the video sample playback time information to the audio packetization part determination unit 110 and the processing operation of determining a packetization part of audio data is performed in the audio packetization part 110.

The extension part of the MP4 file generated through the processing operation by the packetization part determination unit 117 like this reduces the searching workload at the time of random access in a playback apparatus. The reason will be explained with reference to a data structure example of the MP4 file extension part generated by the multiplexer in the second embodiment in FIG. 20.

In the mdat_1 of the MP4 file extension unit 220 shown in FIG. 20A, the video sample of an intra frame is stored as a leading video sample, and a video sample of an intra frame is stored in mdat_2 as a leading video sample.

In this way, storing a video sample of an intra frame in the packet as a leading video sample makes it sufficient to search only the leading video sample in the packet in order to obtain a randomly-accessible video sample at the time of random access at the playback apparatus side, which eliminates the necessity of searching all the video samples included in the packet. Thus, it is possible to widely reduce the workload in searching samples at the time of random access.

Also, at this time, describing the information indicated as randomly accessible in only the leading sample flag field of trun located in the leading part of traf that stores header information of the video track in moof_1 and moof_2 of the MP4 file extension part 220 makes it possible to reduce the size of moof_1 and moof_2.

Here, the extension part of the MP4 file generated by the multiplexer in the second embodiment may be the data structure shown in FIG. 20B.

The video sample of an intra frame is stored in mdat_1 of the MP4 file extension part 230 shown in FIG. 20B as a leading video sample, and a video sample of an intra frame is stored also in mdat_3 as a leading video sample. Also, audio samples are stored in mdat_2 and mdat_4.

In this way, storing one of video data and audio data in a single packet and storing a video sample of an intra frame in the packet that stores the video data as a leading video sample makes it possible to widely reduce the workload in searching samples at the time of random access at the playback apparatus side.

Note that, in any of the data structure examples of these MP4 file extension parts, making the playback start time of the leading video sample stored in the packet the same or approximately the same as the playback start time of the leading audio sample makes it possible to widely reduce the calculation amount needed for data access at the playback apparatus.

As explained up to this point, with the multiplexer in this second embodiment, it is possible to reduce the calculation amount needed for searching samples at the time of random access at the playback apparatus because it generates packets in a way that a randomly-accessible video sample is made to be the leading video sample.

Third Embodiment

Further, the multiplexer in a third embodiment of the present invention will be explained with reference to FIG. 21 to FIG. 25.

The multiplexer in the third embodiment has the same main units as the multiplexers in the above-mentioned first and second embodiments, but it differs from the multiplexers in the above-mentioned first and second embodiments in that it has a unique unit in the packet data generation unit. This different point will be focused on in the following explanation. Note that the same codes are used for the same units as the above-mentioned first and second embodiments and explanations on them will be omitted.

Figure 21:
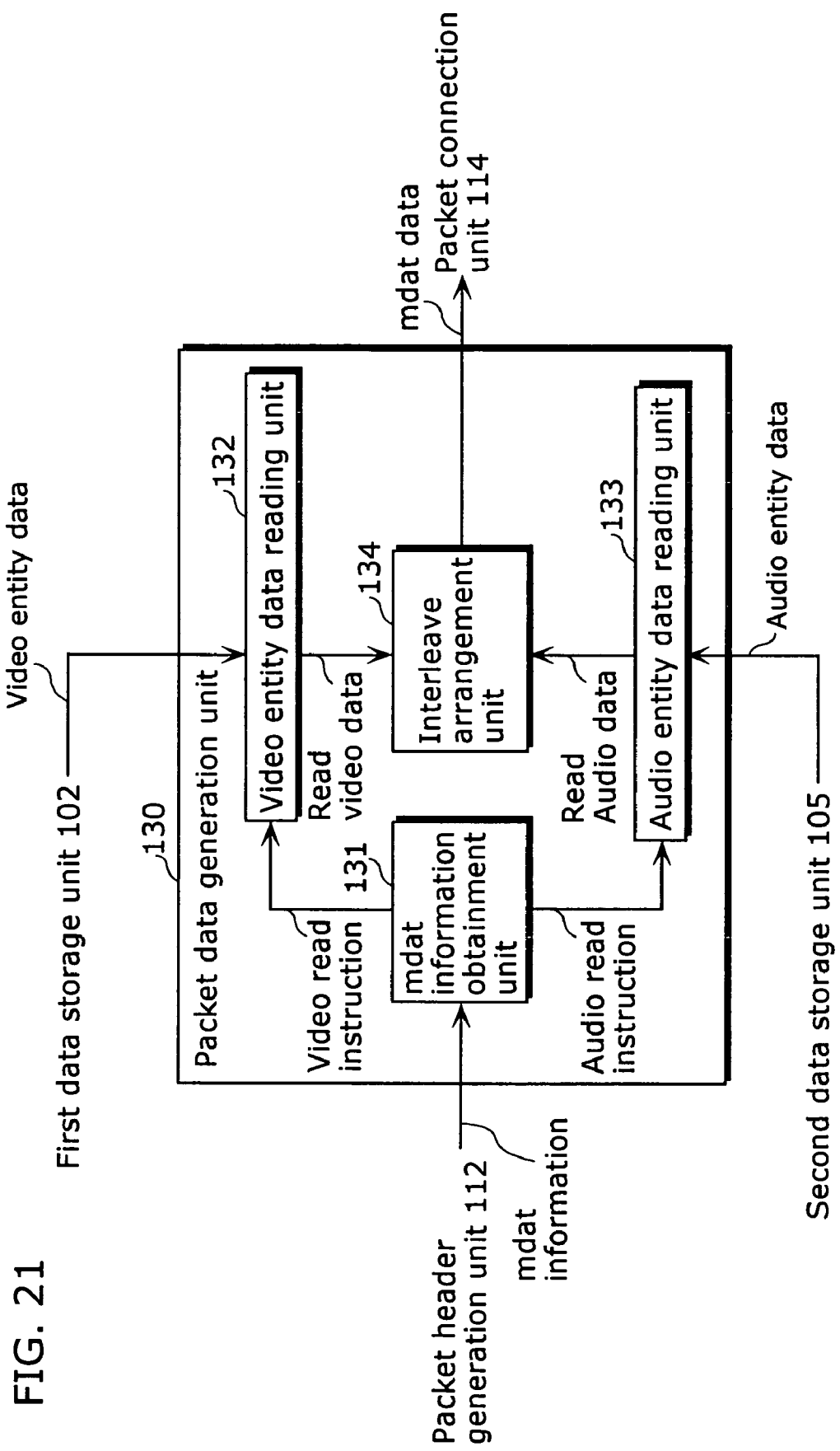
FIG. 21 is a block diagram showing the functional structure of the packet data generation unit of the multiplexer in a third embodiment.

FIG. 21 is a block diagram showing the functional structure of the packet data generation unit of the multiplexer in the third embodiment.

This packet data generation unit 130 is the processing unit that generates a packet data unit (mdat) by interleaving and storing the entity data of the video sample and the entity data of the audio sample, and includes an mdat information obtainment unit 131, a video entity data reading out unit 132, an audio entity data reading out unit 133 and an interleave arrangement unit 134.

The mdat information obtainment unit 131 is the processing unit that obtains the mdat information from the packet header generation unit 112 and outputs the read instruction of the entity data or the playback time information to other units that constitute the packet data generation unit 130.

The mdat information obtainment unit 131 obtains mdat information from the packet header generation unit 112, analyzes the mdat information, obtains the playback time information indicating the playback start times and the playback end times of the video samples and audio samples, and rearranges them based on this playback time information in a way that playback start times of all video samples and audio samples included in the packet are in an ascending order.

After that, the mdat information obtainment unit 131 outputs, to the video entity data reading unit 132, the video read instruction that instructs reading out the entity data of the video sample, or it outputs, to the audio entity data reading unit 133, audio read instruction that instructs reading out the entity data of audio sample starting from the sample whose playback starting time is earliest according to the rearranged order. The video read instruction includes pointer information indicating in which part of the first data storage unit 102 the entity data of the video sample is stored and the size information of the video sample. The audio read instruction includes pointer information indicating which part of the second data storage unit 105 the entity data of the audio sample is stored and the size information of the audio sample.

The video entity data reading unit 132 is the processing unit that obtains the video read instruction from mdat information obtainment unit 131 and reads out the video entity data from the first data storage unit 102. The video entity data reading unit 132 reads out the video entity data from the first data storage unit 102 with reference to the pointer information included in the video read instruction and the size information and outputs the read video entity data to the interleave arrangement unit 134.

The audio entity data reading unit 133 is the processing unit that obtains the audio read instruction from mdat information obtainment unit 131 and reads out the audio entity data from the second data storage unit 105. This audio entity data reading unit 133 reads out audio entity data from the second data storage unit 105 with reference to the pointer information included in the audio read instruction and the size information and outputs the read audio entity data to the interleave arrangement unit 134.

The interleave arrangement unit 134 is the processing unit that obtains the read video data and the read audio data that are outputted from the video entity data reading unit 132 and the audio entity data reading unit 133 in output order, generates mdat data by interleaving and arranging them, and outputs them to the packet connection unit 114.

The processing operation of generating mdat by the packet data generation unit 130 in the multiplexer in the third embodiment that has the packet data generation unit 130 constituted like this will be explained in detail.

Figure 22:
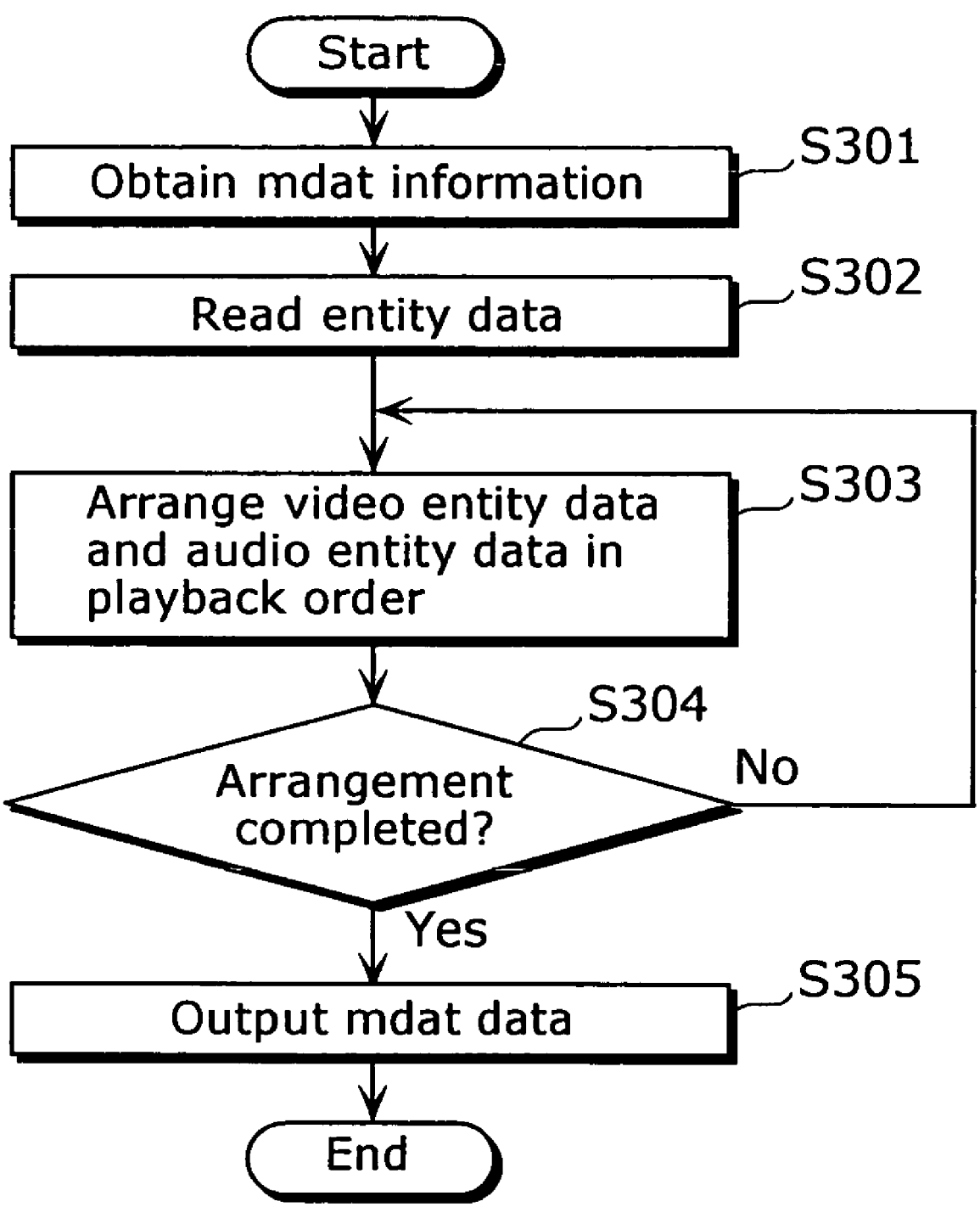
FIG. 22 is a flow chart showing the processing operation of the packet data generation unit.

FIG. 22 is a flow chart showing the processing operation of the packet data generation unit 130.

First, the packet data generation unit 130 obtains mdat information from the packet header generation unit 112 in mdat information obtainment unit 131 (S301). The mdat information obtainment unit 131 analyzes the obtained mdat information and extracts sample pointer information, sample size information and sample playback time information. After that, the mdat information obtainment unit 131 rearranges all the video samples and the audio samples included in a packet based on the extracted sample playback time information in a way that these playback start times are in an ascending order. Consequently, the mdat information obtainment unit 131 outputs the video read instruction including the pointer information and the size information of the extracted video sample to the video entity data reading unit 132 starting from the sample whose playback starting time is earliest according to the rearranged order, or outputs the audio read instruction including the pointer information and the size information of the extracted audio sample to the audio entity data reading unit 133.

The video entity data reading unit 132 obtains the video read instruction, reads out the video entity data from the first data storage unit 102 with reference to the pointer information and the size information so as to output it to the interleave arrangement unit 134. The audio entity data reading unit 133 obtains the audio read instruction, reads out the audio entity data from the second data storage unit 105 with reference to the pointer information and the size information so as to output them to the interleave arrangement unit 134 (S302).

The interleave arrangement unit 134 receives the read entity data from the video entity data reading unit 132 and the audio entity data reading unit 133 and arranges them in the receiving order (S303).

Here, the interleave arrangement unit 134 continues arranging the entity data items until all the entity data items, that is, all the video entity data items and the audio entity data items, stored in a single packet have been completed (No in S304 and S303).

After that, when all the entity data items stored in a single packet have been arranged (Yes in S304), the interleave arrangement unit 134 outputs the arranged entity data to the packet connection unit 114 as mdat data (S305) so as to finish the processing operation of generating mdat.

The extension unit of the MP4 file generated via the processing operation of the packet data generation unit 130 like this is suitable for the random access playback in an optical apparatus or the like that requires a lot of seek time. The reason will be explained indicating the outline of the data structure of the MP4 file extension part generated by the multiplexer in the third embodiment in FIG. 23.

Figure 23:
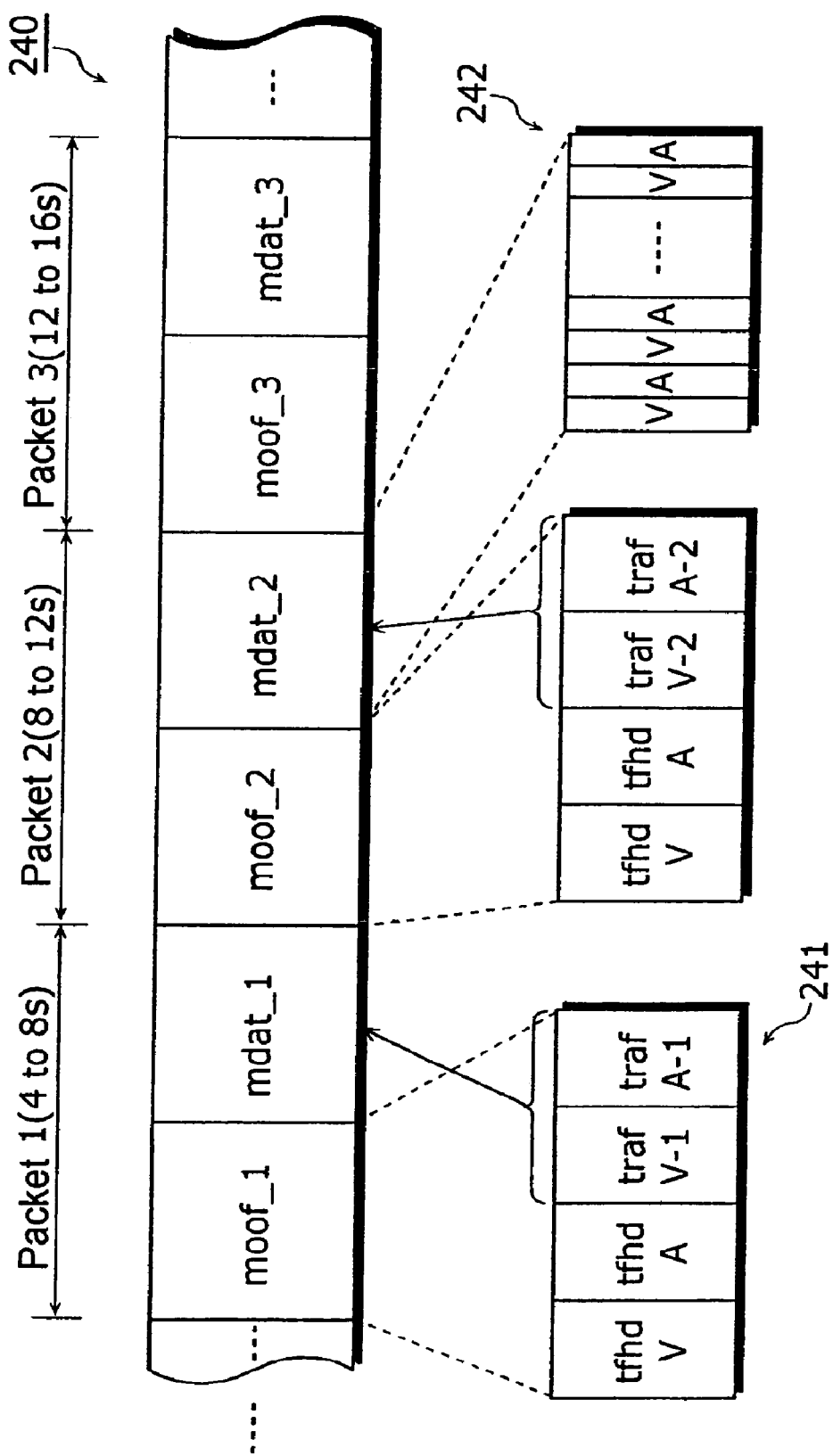
FIG. 23 is a diagram showing the outline of the data structure of the MP4 file extension part generated by the multiplexer.

The MP4 file extension unit 240 shown in FIG. 23 is made of a plurality of arranged packets: packet 1 that stores 4 to 8 second content data; packet 2 that stores 8 to 12 second content data; and packet 3 that stores 12 to 16 second content data.

Each packet is made of moof 241 and mdat 242, and in the moof 241, tfhd (V) and traf (V-1, V-2) concerning a video track and tfhd(A) and traf (A-1, A-2) concerning an audio track are stored. Also, the entity data of a sample indicated by the header information stored in traf (V-1) and traf (A-1) is stored in mdat_1, and the entity data of a sample indicated by the header information stored in traf (V-2) and traf (A-2) are stored in mdata_2. In addition, in mdat 242, the entity data of a video sample and the entity data of an audio sample are stored in a way that they are alternately interleaved.

At this time, moving the reading pointer to the leading position of moof_1 at the time of random access processing that starts playback from the position of 4 second in playback time at a playback apparatus side, analyzing moof_1, and moving the read pointer in sequence makes it possible to obtain the entity data necessary for playback from mdat_1 that is next to moof_1.

In other words, with this MP4 file extension unit 240, the playback apparatus can realize random access playback by a single seek operation that moves the read pointer to the leading position of moof_1. Thus, the apparatus is effective for an optical disc apparatus or the like that requires a lot of time to seek.

Figure 24:
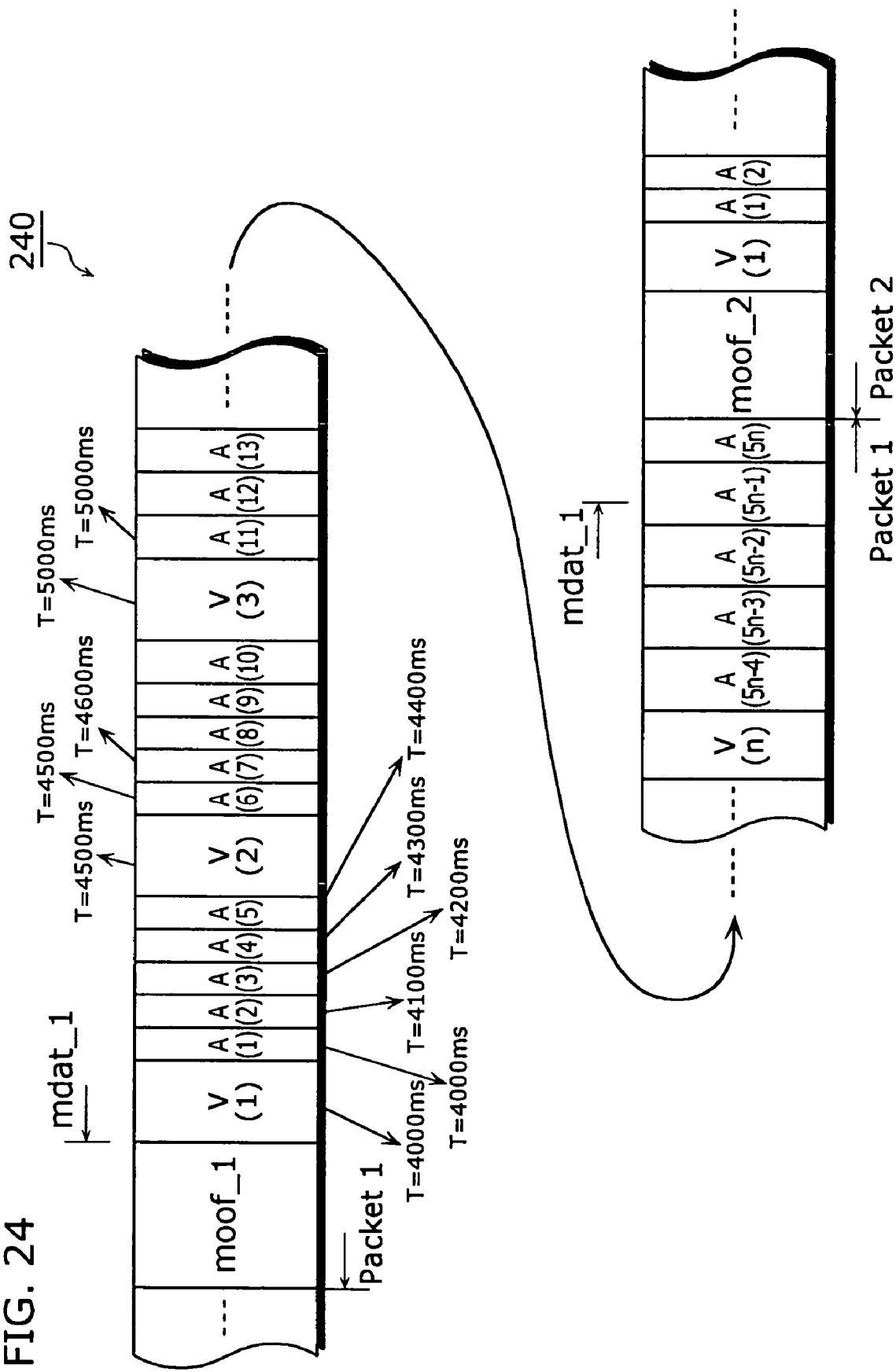
FIG. 24 is a diagram showing the first example of the data structure of the MP4 file extension unit generated by the multiplexer.

In mdat 242, the playback start time of the entity data of an audio sample stored immediately after the entity data of a video sample is made to be the same or approximately the same as the playback start time of the immediately-before video sample, the synchronous playback of video data and audio data are secured. FIG. 24 shows how the entity data is stored in mdat_1 of the MP4 file extension part 240.

As shown in FIG. 24, the playback start time of the video sample 1 stored in the leading part of mdat_1 is 4000 ms, the playback start time of the audio sample 1 stored immediately after the video sample 1 is 4000 ms, and the playback start time of the video sample 1 and the audio sample 1 are made to be the same or approximately the same as each other.

Generally, the sample rate of a video sample differs from the sample rate of an audio sample in most cases, here, the playback duration of a video sample is 500 ms, and the playback duration of an audio sample is 100 ms.

Therefore, in mdat_1 of the MP4 file extension part 240, audio samples 1 to 5 are interleaved and stored immediately after the video sample 1, and after them, video sample 2, audio samples 6 to 10 and video sample 3 are stored in sequence.

At this time, the playback start time of the video sample 2 is 4500 ms, the playback start time of the audio sample 6 stored immediately after the video sample 2 is 4500 ms, and the playback start time of the video sample and the playback start time of the audio sample that is immediately after the video sample is made to be constantly the same or approximately the same as each other.

Also, the sample rate of a video sample differs from the sample rate of an audio sample, there may be a case where the playback start time of the video sample is not the same or approximately the same as the playback start time of the audio sample that is immediately after the video sample. Even in this case, an audio sample whose playback time is the same or approximately the same as the playback start time of the video sample is used for the audio sample, immediately after the video sample, the synchronous playback of the video data and the audio data are secured.

Figure 25:
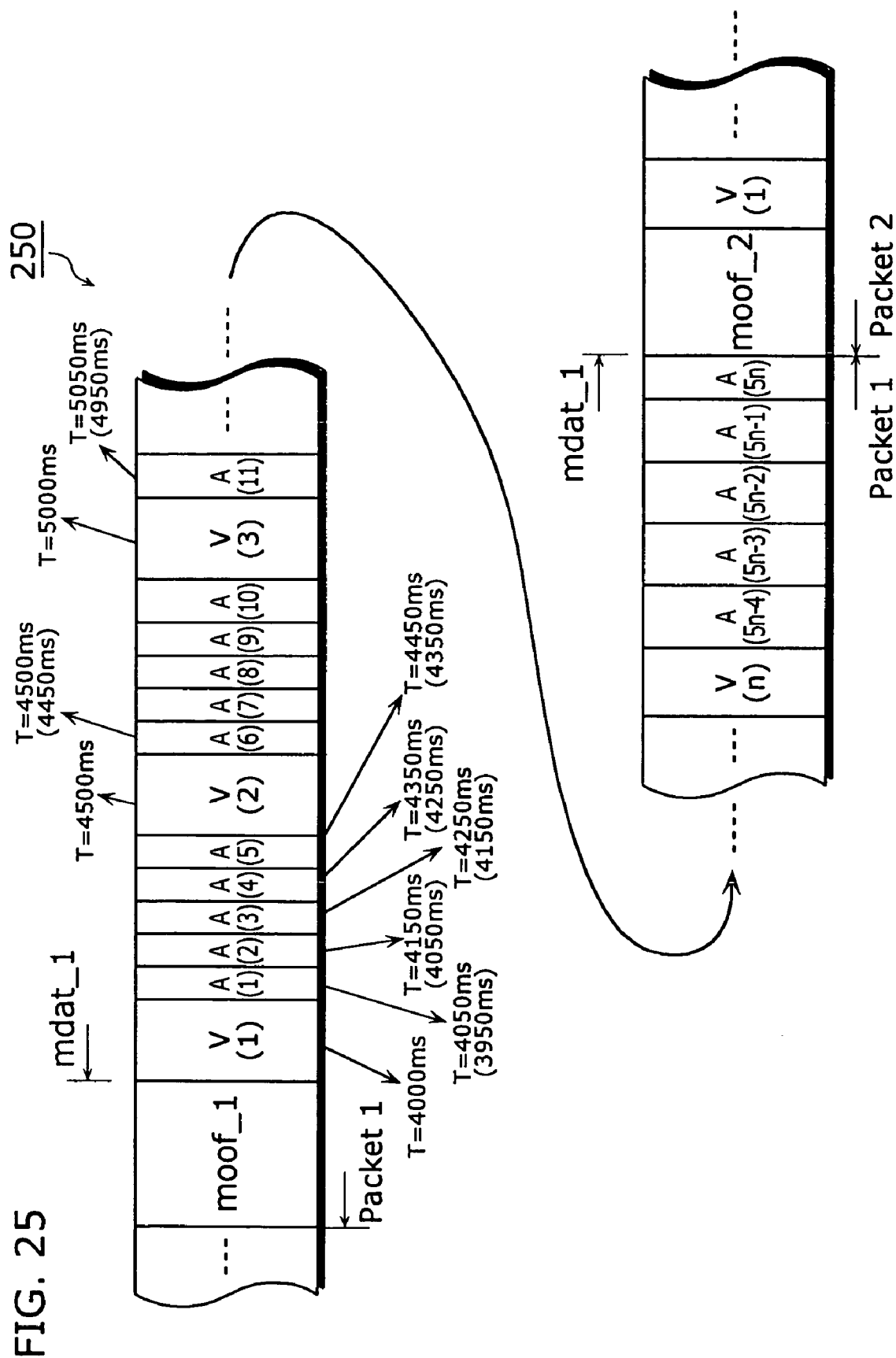
FIG. 25 is a diagram showing the second example of the data structure of the MP4 file extension unit generated by the multiplexer.

FIG. 25 is a diagram showing the second data structure indicating how the entity data is stored in mdat_1 of the MP4 file extension part.

As shown in FIG. 25, the playback start time of the video sample 1 stored in the leading part of mdat_1 of the MP4 file extension part 250 is 4000 ms, the playback start time of the audio sample 1 stored immediately after the video sample 1 is 4050 ms, and the audio sample 1 that is placed after the playback start time of the video sample 1 and whose playback start time is the earliest is stored as an audio sample stored immediately after the video sample 1.

Here, as in the case that has already been explained, the playback duration of a video sample is 500 ms, and the playback duration of an audio sample is 100 ms.

Therefore, in mdat_1 of the MP4 file extension part 250, audio samples 1 to 5 are interleaved and stored immediately after the video sample 1, after that, video sample 2, audio samples 6 to 10 and video sample 3 are stored in sequence.

At this time, the playback start time of the video sample 2 is 4500 ms, the playback start time of the audio sample 6 stored immediately after the video sample 2 is 4550 ms, and the playback start time of the video sample and playback start time of the audio sample immediately after the video sample are made to be the same or approximately the same as each other.

Note that, as an audio sample stored immediately after the video sample here, an audio sample which is located before the playback start time of the video sample and whose playback start time is the last may be stored as an audio sample stored immediately after the video sample. In this case, the playback time of the audio sample 1 stored immediately after the video sample 1 is 3950 ms.

As explained up to this point, with the multiplexer in the third embodiment, as an audio sample whose playback start time is the same or approximately the same as the playback start time of the video sample is placed immediately after the video sample, and video samples and audio samples are interleaved and stored in mdat in a way that their playback start times are arranged in an ascending order, it is possible to generate an MP4 file extension part which has a data structure that enables an immediate random access even in a playback apparatus which has a slow seek speed. Further, video and audio samples can be interleaved by the unit that consists of more than one sample.

Fourth Embodiment

A demultiplexer in a fourth embodiment of the present invention will be explained with reference to FIG. 26 and FIG. 27.

Figure 26:
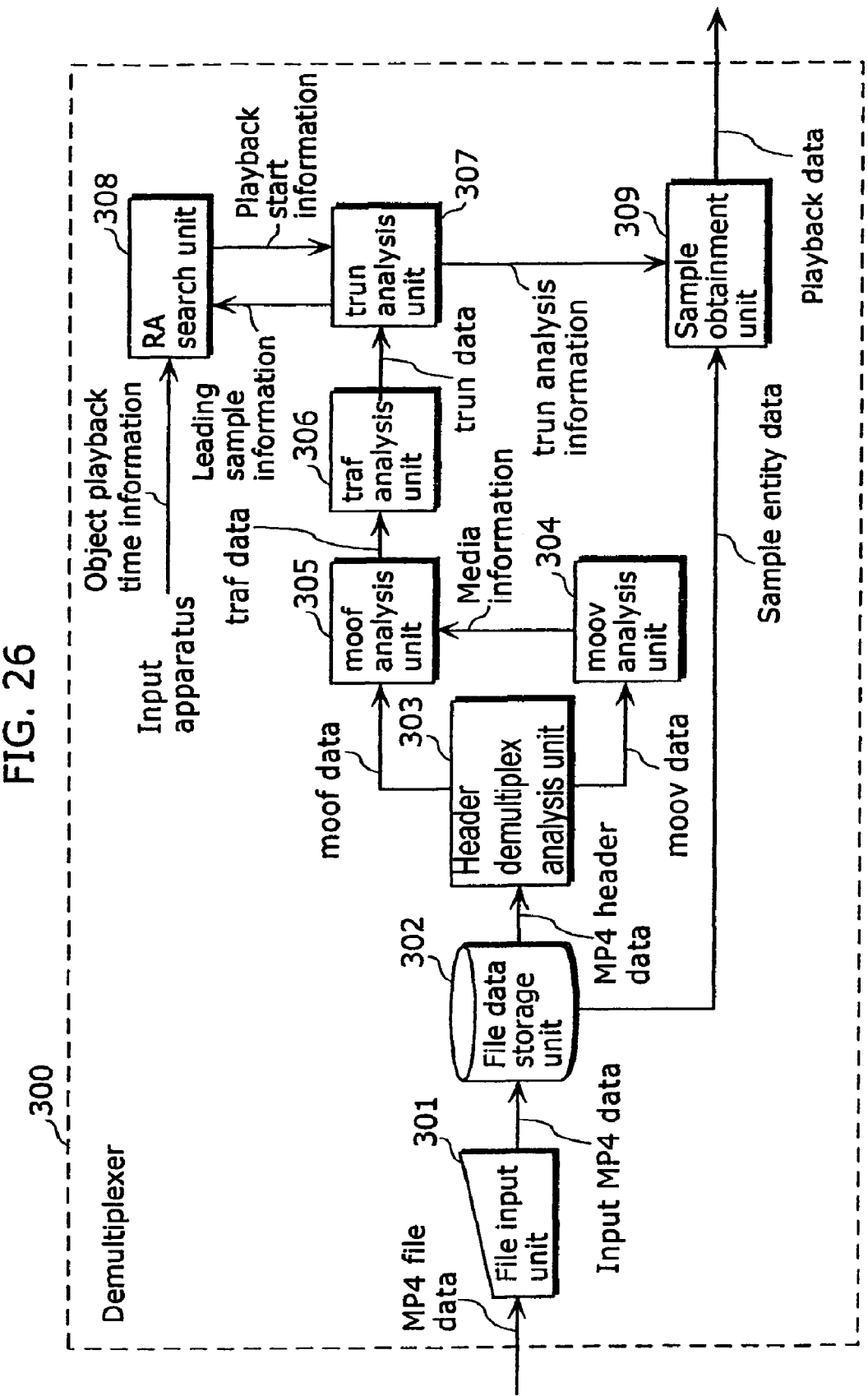
FIG. 26 is a block diagram showing the functional structure of a demultiplexer in a fourth embodiment.

FIG. 26 is a block diagram showing a functional structure of the demultiplexer in the fourth embodiment.

The demultiplexer 300 is the apparatus that obtains and analyzes the MP4 file data including the MP4 file extension part generated by the multiplexer in the above-mentioned first, second and third embodiments, demultiplexes the media data and outputs the playback data, and includes a file input unit 301, a file data storage unit 302, a header demultiplex analysis unit 303, a moov analysis unit 304, a moof analysis unit 305, a traf analysis unit 306, a trun analysis unit 307, an RA searching unit 308 and a sample obtainment unit 309.

The file input unit 301 is an interface that obtains an MP4 file data and stores the input data items in the obtained MP4 file in the file data storage unit 302 in this sequence.

The file data storage unit 302 is a cache memory, a RAM or the like that temporally stores the MP4 input data.

The header demultiplex analysis unit 303 is the processing unit that reads out and analyzes the header data in the MP4 file among the MP4 input data items stored in the file data storage unit 302, demultiplexes moov data of the basic part header in the MP4 file from moof data of the extension part and outputs them to the moov analysis unit 304 and the moof analysis part 305 respectively, and is realized in a form of a CPU or a memory.

The moov analysis unit 304 is the processing unit that analyzes moov of the MP4 file and obtains the media information necessary for analyzing the media data such as the coding rate of the media data or the playback time of a content, and is realized in a form of a CPU or a memory. This moov analysis unit outputs the obtained media information to moof analysis unit 305.

The moof analysis unit 305 is the processing unit that analyzes moof of the MP4 file based on the media information obtained from moov analysis unit 304 and outputs traf data that is the header data for each track to traf analysis unit 306, and is realized in a form of a CPU or a memory.

The traf analysis unit 306 is the processing unit that analyzes traf of the MP4 file and outputs trun data that is the header data for each sample included in traf to trun analysis unit 307, and is realized in a form of a CPU or a memory.

The trun analysis unit 307 is the processing unit that analyzes trun of the MP4 file, obtains the information described in each field of trun, and outputs trun analysis information to the sample obtainment unit 309, and is realized in a form of a CPU or a memory. This trun analysis information includes, such as, a sample size, data offset information indicating which part of the file data storage unit 302 the sample is stored, and in the case of a video sample, flag information indicating whether it is an intra frame or not and the like.

Also, on obtaining, from the RA searching unit 308 that is explained next, a playback start instruction that shows a playback start position after random access and instructs the start of playback, the trun analysis unit 307 analyzes truns starting from the trun shown by the playback start instruction in this sequence and outputs trun analysis information to the sample obtainment unit 309.

The RA searching unit 308 is the processing unit that obtains a target playback time information showing the playback start time after random access, reads out the leading sample information that is the information indicating the playback start time of the leading sample included in the leading trun in the leading traf that stores the header information concerning the video track and searches the video sample that is the playback start position after random access, and is realized in a form of a CPU or a memory. On obtaining the target playback time information from the input apparatus of the demultiplexer 300 that receives a random access instruction from a user, this RA searching unit 308 obtains only the leading sample information from trun analysis unit 307 in this sequence, searches a video sample whose playback start time is the same or approximately the same as the target playback time information and outputs a playback start instruction to trun analysis unit 307.

The sample obtainment unit 309 is the processing unit that reads out and decodes the entity data of a sample based on trun analysis information and outputs the playback data to a display apparatus such as a display. On obtaining trun analysis information from trun analysis unit 307, this sample obtainment unit 309 refers to data offset information included in this and reads the entity data of a sample from the file data storage unit 302. The start of obtaining trun analysis information means that the start of playback is instructed.

The operation of random access processing in the demultiplexer 300 constituted like this will be explained with reference to FIG. 27.

Figure 27:
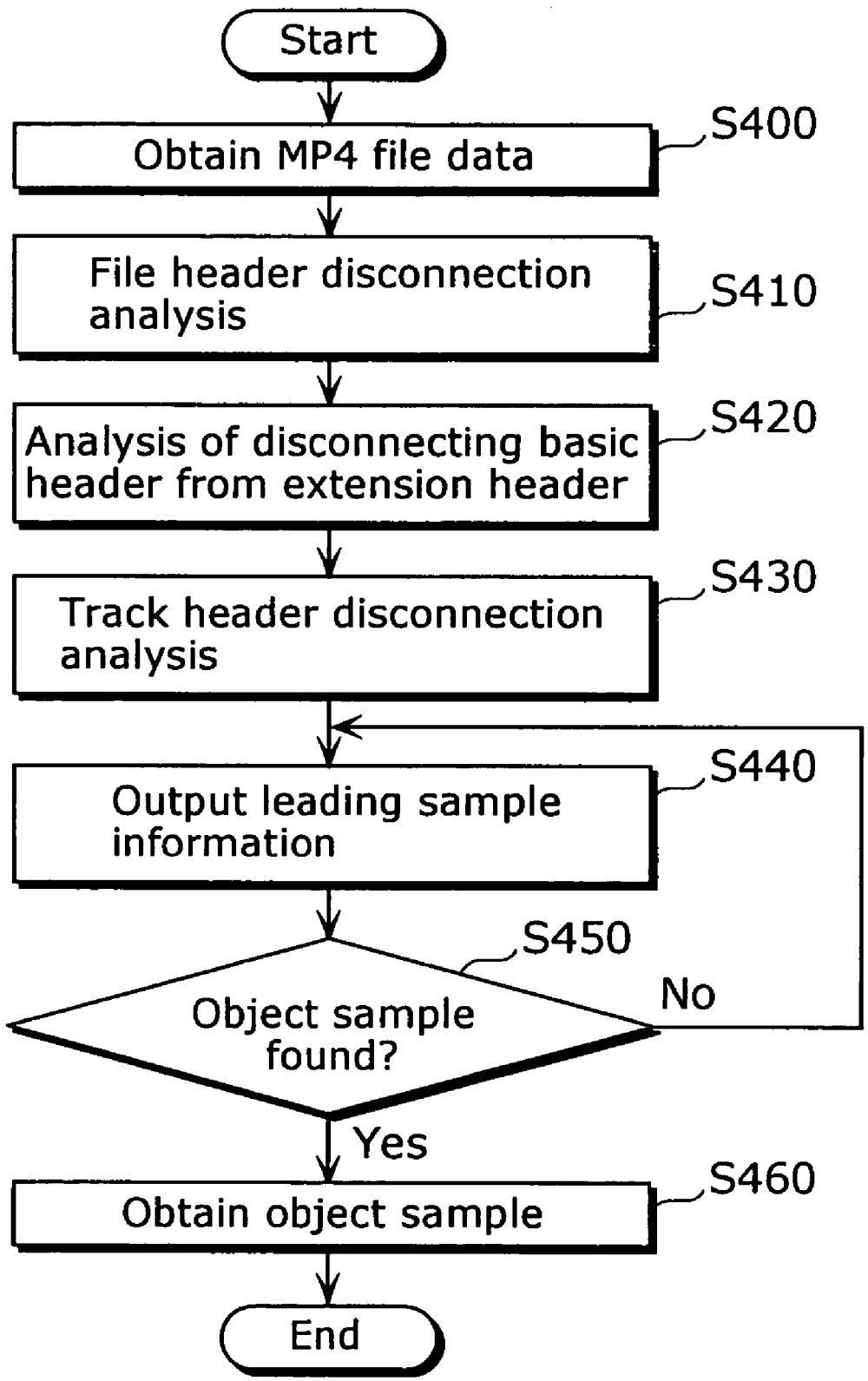
FIG. 27 is a flow chart showing the processing operation of the demultiplexer.

FIG. 27 is a flow chart showing the operation of random access processing of the demultiplexer 300. Note that the demultiplexer 300 receives a random access instruction from a user via an input apparatus prior to this flow.

First, on obtaining data items of the MP4 file generated in the multiplexer in the above-mentioned first, second and third embodiments in the file input unit 301 (S400), the demultiplexer 300 stores the data items in the file data storage unit 302 in this sequence.

Next, the demultiplexer 300 demultiplexes and analyzes only the file header part of the MP4 file in the header demultiplex and analysis unit 303 (S410), further demultiplexes the basic part header from the extension part header, analyzes the basic part header in moov analysis unit 304 and analyzes the extension part in moof analysis unit 305 (S420).

Consequently, the demultiplexer 300 further demultiplexes the extension header into headers for each track in moof analysis unit 305, and analyzes the track fragment that is traf in traf analysis unit 306 (S430). At this time, the demultiplexer 300 further demultiplexes the track fragment in traf analysis unit 306 and analyzes trun in trun analysis unit 307.

Here, in response to the input of target playback time information in RA searching unit 308, the demultiplexer 300 outputs the leading sample information from the trun analysis unit 307 to the RA searching unit 308 and judges whether it is the leading sample information whose playback start time is the same or approximately the same as the one shown by the target playback time information or not in RA searching unit 308 (S440).

At this time, in the case where no target sample is found (No in S450), the demultiplexer 300 obtains leading sample information in the extension part header that is located next in storing sequence in a file in the RA searching unit 308 and judges whether it is the leading sample information whose playback start time is the same or approximately the same as the target playback time information that has already been obtained or not (S440).

On the other hand, in the case where a target sample is found (Yes in S450), the demultiplexer 300 generates a playback start instruction in the RA searching unit 308 and outputs it to trun analysis unit 307. On receiving a playback start instruction from the RA searching unit 308, the trun analysis unit 307 outputs trun analysis information to the sample obtainment unit 309 starting from the trun to which a playback start instruction is given. Here, the trun to which a playback start instruction is given indicates the trun including a sample for which playback start is indicated in the RA searching unit 308.

After that, the demultiplexer 300 refers to the data offset information included in trun analysis information in the sample obtainment unit 309, obtains the entity data of the target sample from the file data storage unit 302 (S460), decodes the data, and outputs the playback data so as to finish the operation of random access processing.

As explained up to this point, with the demultiplexer 300 of the fourth embodiment, searching only a video sample stored in the leading part of each packet at the time of performing random access playback in the MP4 file including the MP4 file extension unit generated by the multiplexer in the above-mentioned first, second and third embodiments makes it possible to judge the video sample that should be the playback start position after random access. Thus, the workload in searching samples at the time of random access is widely reduced.

Application

Here, an application of the multiplexer in the present invention will be explained with reference to FIG. 28.

Figure 28:
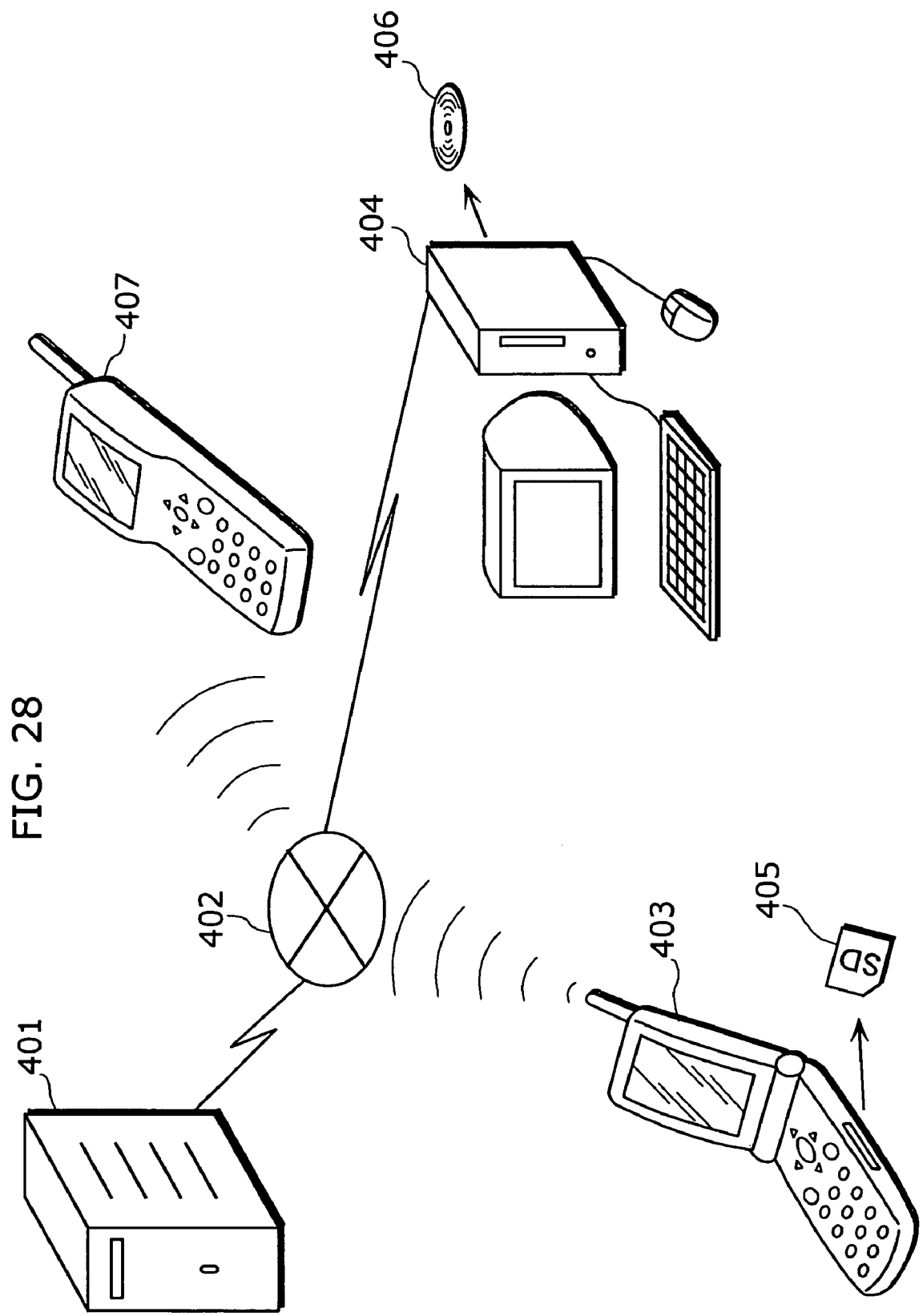
FIG. 28 is a diagram showing an application of the multiplexer in the present invention.

FIG. 28 is a diagram showing an application of the multiplexer in the present invention.

The multiplexer in the present invention may be applied for a mobile telephone with a recording function or a personal computer 404 that obtains and multiplexes media data such as video data, audio data or the like and generates MP4 file data. Also, the demultiplexer in the present invention may be applied for a mobile telephone 407 that reads the generated MP4 file data and plays it back.

The MP4 file data generated in the mobile telephone with a recording function 403 and the personal computer 404 are stored in a recording medium such as an SD memory card 405, a DVD-RAM 406 or the like or sent to the image distribution server 401 via the communication network 402 so as to be distributed from the image distribution server 401 to the mobile telephone 407 or the like.

In this way, the multiplexer and the demultiplexer in the present invention are used for an MP4 file generation apparatus or a playback apparatus in the image distribution system or the like.

Up to this point, the multiplexer and the demultiplexer in the present invention have already been explained based on the respective embodiments and the like, this present invention is not limited to these embodiments and the like.

For example, coded data of MPEG-4 visual is used as video data in the above-mentioned embodiments, but coded data on which other video compression coding method such as MPEG-4 advanced video coding (AVC), H.263 or the like may be used. Note that a single picture corresponds to a single sample in the coded data of MPEG-4 Advanced video coding (AVC) or H.263.

Likewise, coded data of MPEG-4 audio is used as audio data, but coded data on which other audio compression coding methods such as G. 726 may be used as audio data.

Also, in the explanation made in the above-mentioned embodiments, video data and audio data are used, but it is possible to obtain the efficiency of the present invention by processing the audio data as in the case of packetization even in the case where text data and the like are included.

Further, in the above-mentioned second embodiment, it is possible to omit the time-based part adjustment unit 120 from the units of the packetization part determination unit 117 and omit processing of step S205 in FIG. 18 in the case where packetization is performed for each intra frame.

Also, in the above-mentioned third embodiment, in the case where the MP4 file is played back according to the buffer model that is previously set at a playback apparatus of the MP4 file, video sample data and audio sample data are interleaved and stored in mdat so that the buffer model is satisfied. A buffer model is a model for guaranteeing that a playback apparatus can perform decoding preventing the buffer from becoming empty (underflow) or preventing data from overflowing the buffer (overflow) by causing the playback apparatus to have a buffer whose size is prescribed in a standard in the case where coded data are inputted according to conditions prescribed in the standard.

Also, in the above-mentioned first, second and third embodiments, the number of trafs stored in moof of the extension part of the MP4 file to be generated is not mentioned, but it is preferred that traf to be stored in moof stores a single traf per a single track. This makes it possible to obtain header information of samples of all the tracks to be stored in moof by analyzing only leading traf in moof track by track, and thus the efficiency at the time of obtaining header information further improves.

Further, in the above-mentioned first, second and third embodiments, the entity data of samples whose header information items are stored in moof of the extension part of the MP4 file to be generated are stored in a single mdat next to moof, but it is possible to divide the sample into a plural mdat next to moof and store them. Specifically explaining, the entity data items of samples whose header information items may be stored in moof_1 are stored in mdat_1, mdat_2 and mdat_3 in this sequence and the entity data items of samples whose header information items may be stored in moof_2 are stored in mdat_4, mdat_5 and mdat_6 in this sequence.

After that, in the case where an intra frame of video data is included in the packet, the intra frame should be placed in the leading part of the packet in the above-mentioned second and third embodiments, but it is possible to place the video sample other than an intra frame such as a predictive (P) frame, a bidirectionally predictive (B) frame or the like in the leading part of the packet on condition that they are randomly accessible. This will be explained taking the case where coded data of MPEG-4 AVC are used as video data below as an example.

In MPEG-4 AVC, there is a case where no right decoding result is obtained even in the case of decoding from an intra picture. More specifically, there are two types of intra pictures of MPEG-4 AVC: an instantaneous decoder refresh (IDR) picture and other pictures (called a non-IDR intra picture). It is possible to always obtain a right decoding result when starting decoding from an IDR picture, but right decoding result may not be obtained in the case of a non-IDR intra picture and a plurality of pictures after the non-IDR intra picture in display order.

Therefore, in MPEG-4 AVC, it is possible to add recovery point supplemental enhancement information called "recovery point SEI" indicating from which picture decoding should be started in order to obtain a right decoding result from the non-IDR intra picture.

For example, five pictures indicated as Pic_1, Pic_2, Pic_3, Pic_4, Pic_5 are included in the video data in this sequence. When trying to decode Pic_5 and pictures after Pic_5 in display sequence on condition that Pic_5 is a non-IDR intra picture, in the case where the decoding must be started from Pic_1, placing recovery point SEI at immediately before Pic_1 makes it possible to indicate that the decoding must be started from Pic_1 in order to decode Pic_5 that is the picture placed four pictures later in storage order in the video data and pictures after the Pic_5 in display sequence.

In other words, Pic_1 is a randomly-accessible sample in this case, in the case of coded data of MPEG-4 AVC, it is possible to place a sample of the IDR picture or the picture to which recovery point SEI is added in the leading part of the packet as a randomly-accessible sample. Further, random-accessible samples that do not have recovery point SEI can be the leading sample in a packet. Note that the recovery point SEI can be added to the picture other than an intra picture.

At this time, it is possible to reduce the processing amount at the time of obtaining sample data by storing a sample of the picture to which recovery point SEI is added and a sample of the picture that can be decoded right for the first time after starting decoding from the picture to which recovery point SEI is added.

Further, it is possible to identify the IDR picture from the sample of the picture to which recovery point SEI is added based on the leading sample flag 930 or a specific flag value in the sample flag 935 (called as nonsynchronous sample flag). In the MP4, it is possible to set, at 0, the nonsynchronous sample flag of only the sample, among randomly-accessible samples, on which random access is allowed is the sample which is correctly decoded. Therefore, it is possible to identify them both by making the nonsynchronous sample flag as 0 in the sample of the IDR picture and making the nonsynchronous sample flag as 1 in the sample of the picture to which recovery point SEI is added.

By using an identification method like the above, it is possible to differentiate randomly-accessible samples from each other based on nature. In reality, it can be used like below.

First case is to perform forwarding by playing back only specific samples. At this time, as it is desirable that the decoded samples can immediately be displayed, only samples whose nonsynchronous sample flag is 0 are decoded and played back.

Second case is to start playing back from the middle of the content or next area by skipping specific areas. At this time, only in the case of starting playing back, the sample from which decoding is started may differ from the sample which is correctly decoded. Therefore, either from the sample whose nonsynchronous sample flag is 0 or from the randomly-accessible sample whose nonsynchronous sample flag is 1 playback can be started.

Note that this storage method is not limited to the case of recovery point SEI of MPEG-AVC, it is applicable for the case where the sample from which decoding is started differs from the sample which is correctly decoded. For example, it can be applicable for the structure such as Open GOP (Group of Pictures) MPEG-2 video.

Further, in the case where identification information indicating that the sample is randomly accessible, it is possible to place the sample identified as randomly accessible by the identification information in the leading part of the packet.

INDUSTRIAL APPLICABILITY

The multiplexer in the present invention is suitable for a digital video camera, a mobile phone with a recording function or the like that generates an MP4 file data by obtaining media data such as video data or audio data and stores it in a recording medium, or a personal computer, a PDA or the like that distributes the generated MP4 file data via the Internet, and the demultiplexer in the present invention is suitable for a personal computer, a mobile phone or the like that downloads and plays back the MP4 file data.

The invention claimed is:

1. A multiplexer that is for generating multiplexed data by multiplexing packets of media data including image data and at least one of audio data and text data, comprising:
   a media data obtainment unit for obtaining the media data;
   an analysis unit for analyzing the media data obtained by the media data obtainment unit and for obtaining playback start time information that indicates a playback start time of a sample that is a smallest access unit of the image data, audio data and text data included in the media data;
   a packetization part determination unit for determining, based on the playback start time information obtained by the analysis unit, and in all the packets necessary for storing the media data, a packetization part of the media data such that playback start times of respective samples of the image data, audio data and text data that are included in the media data are made to be the same;
   a packet header part generation unit for generating a packet header part that holds a header of the media data on a basis of the packetization part;
   a packet data part generation unit for generating a packet data part that holds entity data of the media data on a basis of the packetization part; and
   a packetization unit for generating a packet by connecting the packet header part with the packet data part.

2. The multiplexer according to claim 1,
wherein the packetization part determination unit further makes the playback start times of a sample of the audio data placed in a leading part of the packetization part and a sample of the text data the same as the playback start time of a sample of the image data placed in the leading part of the packetization part.

3. The multiplexer according to claim 2,
wherein the packetization part determination unit further determines a sample of the audio data and a sample of the text data that are placed in the leading part of the packetization part as a sample whose playback start time is after the playback start time of a sample of the image data placed in the leading part of the packetization part and the earliest to the playback start time of a sample of the image data.

4. The multiplexer according to claim 2,
wherein the packetization part determination unit further determines a sample of the audio data and a sample of the text data that are placed in the leading part of the packetization part as a sample whose playback start time is before the playback start time of a sample of the image data placed in the leading part of the packetization part and the earliest to the playback start time of a sample of the image data.

5. The multiplexer according to claim 1,
wherein the image data is video data,
the analysis unit further analyzes the video data obtained by the media data obtainment unit and obtains intra frame information when the video data includes at least one sample including the intra frame information indicating that the at least one sample is an intra coded sample,
the packetization part determination unit further determines the media data as the packetization part based on the intra frame information and the playback start time information when the analysis unit obtains the intra frame information.

6. The multiplexer according to claim 5,
wherein the packetization part determination unit further places a sample of the video data including the intra frame information in a leading part of the packetization part.

7. The multiplexer according to claim 6,
wherein the packetization part determination unit further makes playback start time of the sample of the video data including the intra frame information placed in the leading part of the packetization part the same as the playback start time of a sample of the audio data and a sample of the text data that are placed in the leading part of the packetization part.

8. The multiplexer according to claim 1,
wherein the packet data part generation unit further generates a packet data part for storing samples of the media data included in the packetization part by interleaving such that the playback start times of the samples are in an ascending order.

9. The multiplexer according to claim 8,
wherein the packet data part generation unit further generates the packet data part for storing samples of the media data included in the packetization part by interleaving such that a previously set condition is satisfied.

10. A multiplexing method for generating multiplexed data by multiplexing packets of media data including image data and at least one of audio data and text data, comprising:

obtaining the media data;

obtaining playback start time information indicating a playback start time of a sample that is a smallest access unit of the image data, audio data and text data included in the media data by analyzing the media data obtained in said obtaining the media data;

determining, based on the playback start time information obtained in said obtaining playback start time information and in all the packets necessary for storing the media data, a packetization part of the media data such that playback start times of respective samples of the image data, audio data and text data that are included in the media data are made to be the same;

generating a packet header part that holds a header of the media data on a basis of the packetization part;

generating a packet data part that holds entity data of the media data on a basis of the packetization part; and generating a packet by connecting the packet header part to the packet data part.

11. The multiplexer according to claim 10, wherein, in said determining, playback start times of a sample of the audio data and a sample of the text data that are placed in a leading part of the packetization part are made to be the same as the playback start time of a sample of the image data placed in the leading part of the packetization part.

12. The multiplexing method according to claim 10, wherein the image data is video data, in said obtaining playback start time information intra frame information is obtained when at least one sample including intra frame information indicating that the video data is an intra coded sample is included by analyzing the video data obtained in said obtaining the media data, and in said determining, the packetization part of the media data is determined based on the intra frame information and the playback start time information when the intra frame information is obtained in said obtaining playback start time information.

13. The multiplexing method according to claim 12, wherein in said determining, a sample of the video data including the intra frame information is placed in a leading part of the packetization part.

14. The multiplexing method according to claim 13, wherein in said determining, playback start times of a sample of the audio data and a sample of the text data that are placed in the leading part of the packetization part are made to be the same as a playback start time of a sample of the video data including the intra frame information placed in the leading part of the packetization part.

15. The multiplexing method according to claim 10, wherein in said generating a packet data part, a packet data part for storing samples of the media data included in the packetization part is generated by interleaving such that playback start times of the samples are in an ascending order.

16. A computer program recorded on a computer-readable recording medium for a multiplexer that is for generating multiplexed data by multiplexing packets of media data including image data and at least one of audio data and text data, the program for causing a computer to execute at least the following in a multiplexing method comprising:

obtaining the media data;

obtaining playback start time information indicating a playback start time of a sample that is a smallest access unit of the image data, audio data and text data included in the media data by analyzing the media data obtained in said obtaining the media data;

determining, based on the playback start time information obtained in said obtaining playback start time information and in all the packets necessary for storing the media data, a packetization part of the media data such that playback start times of respective samples of the image data, audio data and text data that are included in the media data are made to be the same;

generating a packet header part that holds a header of the media data on a basis of packetization part;

generating a packet data part that holds entity data of the media data on a basis of the packetization part; and generating a packet by connecting the packet header part and the packet data part.

* * * * *